(12) United States Patent
Morgas et al.

(10) Patent No.: US 11,562,482 B2
(45) Date of Patent: Jan. 24, 2023

(54) SYSTEMS AND METHODS FOR PSEUDO IMAGE DATA AUGMENTATION FOR TRAINING MACHINE LEARNING MODELS

(71) Applicant: VARIAN MEDICAL SYSTEMS INTERNATIONAL AG, Steinhausen (CH)

(72) Inventors: Tomasz Morgas, Henderson, NV (US); Benjamin M. Haas, Roggwil (CH); Pascal Paysan, Baden-Dättwil (CH); Angelo Genghi, Wettingen (CH)

(73) Assignee: VARIAN MEDICAL SYSTEMS INTERNATIONAL AG, Steinhausen (CH)

(*) Notice: Subject to any disclaimer, the term of this patent is extended or adjusted under 35 U.S.C. 154(b) by 104 days.

(21) Appl. No.: 16/835,033

(22) Filed: Mar. 30, 2020

(65) Prior Publication Data
US 2021/0304402 A1   Sep. 30, 2021

(51) Int. Cl.
*G06T 7/00* (2017.01)
*G06T 7/149* (2017.01)
*G06N 20/00* (2019.01)

(52) U.S. Cl.
CPC ........... *G06T 7/0012* (2013.01); *G06N 20/00* (2019.01); *G06T 7/149* (2017.01);
(Continued)

(58) Field of Classification Search
None
See application file for complete search history.

(56) References Cited

U.S. PATENT DOCUMENTS

| 9,280,819 B2 | 3/2016 | Codella et al. |
| 10,169,871 B2 | 1/2019 | Stanley et al. |

(Continued)

FOREIGN PATENT DOCUMENTS

| CN | 107913077 A | * | 4/2018 | ............... A61B 6/52 |
| CN | 110234400 A | * | 9/2019 | ......... G01R 33/5608 |

(Continued)

OTHER PUBLICATIONS

Machine translation of CN-107913077-A (Year: 2018).*
(Continued)

*Primary Examiner* — Vu Le
*Assistant Examiner* — Courtney Joan Nelson
(74) *Attorney, Agent, or Firm* — SGPatents PLLC

(57) ABSTRACT

Systems and methods for augmenting a training data set with annotated pseudo images for training machine learning models. The pseudo images are generated from corresponding images of the training data set and provide a realistic model of the interaction of image generating signals with the patient, while also providing a realistic patient model. The pseudo images are of a target imaging modality, which is different than the imaging modality of the training data set, and are generated using algorithms that account for artifacts of the target imaging modality. The pseudo images may include therein the contours and/or features of the anatomical structures contained in corresponding medical images of the training data set. The trained models can be used to generate contours in medical images of a patient of the target imaging modality or to predict an anatomical condition that may be indicative of a disease.

20 Claims, 20 Drawing Sheets

(52) U.S. Cl.
CPC ............... *G06T 2207/10081* (2013.01); *G06T 2207/10088* (2013.01); *G06T 2207/10104* (2013.01); *G06T 2207/10108* (2013.01); *G06T 2207/10132* (2013.01)

(56) References Cited

U.S. PATENT DOCUMENTS

| | | | |
|---|---|---|---|
| 10,282,588 | B2 | 5/2019 | Comaniciu et al. |
| 10,445,904 | B2 | 10/2019 | Jerebko et al. |
| 10,535,138 | B2 | 1/2020 | Pfeiffer |
| 2010/0046821 | A1* | 2/2010 | Manjeshwar ......... G06T 11/008 382/131 |
| 2010/0054564 | A1* | 3/2010 | Vija ........................ G06T 5/002 382/131 |
| 2010/0080354 | A1* | 4/2010 | Fu ............................ G06T 5/50 378/65 |
| 2015/0055842 | A1* | 2/2015 | Codella ................... G06T 7/143 382/131 |
| 2017/0103287 | A1 | 4/2017 | Han |
| 2019/0042885 | A1 | 2/2019 | Han |
| 2019/0050723 | A1 | 2/2019 | Kong et al. |
| 2019/0209099 | A1 | 7/2019 | Han |
| 2019/0333219 | A1 | 10/2019 | Xu et al. |
| 2019/0362522 | A1 | 11/2019 | Han |

FOREIGN PATENT DOCUMENTS

| | | | | |
|---|---|---|---|---|
| WO | WO-2018048507 | A1 * | 3/2018 | ............. A61B 5/055 |
| WO | WO-2019124836 | A1 * | 6/2019 | ............... A61B 8/00 |

OTHER PUBLICATIONS

Machine translation of WO-2019124836-A1 (Year: 2019).*
Machine translation of CN 110234400 A (Year: 2019).*
Bi, L., Kim, J., Kumar, A., Feng, D., Fulham, M. (2017). Synthesis of Positron Emission Tomography (PET) Images via Multi-channel Generative Adversarial Networks (GANs). In: Molecular Imaging, Reconstruction and Analysis of Moving Body Organs, and Stroke Imaging and Treatment. RAMBO CMMI SWITCH 2017 (Year: 2017).*
[continuation of item X on p. 1] Lecture Notes in Computer Science, vol. 10555. Springer, Cham. https://doi.org/10.1007/978-3-319-67564-0_5 (Year: 2017).*
Zhao, Xiangming, et al. "Tumor Co-Segmentation in PET/CT Using Multi-Modality Fully Convolutional Neural Network." Physics in Medicine Biology, vol. 64, No. 1, 2018, p. 015011., https://doi.org/10.1088/1361-6560/aaf44b. (Year: 2018).*
Y. Wang et al., "3D Auto-Context-Based Locality Adaptive Multi-Modality GANs for PET Synthesis," in IEEE Transactions on Medical Imaging, vol. 38, No. 6, pp. 1328-1339, Jun. 2019, doi: 10.1109/TMI.2018.2884053 (Year: 2019).*
Schreier et al., "Clinical evaluation of a full-image deep segmentation algorithm for the male pelvis on cone-beam CT and CT", Radiotherapy and Oncology, 145, 2020, pp. 1-6.
Montufar et al., "Perspective and orthogonal CBCT/CT digitally reconstructed radiographs compared to conventional cephalograms", International Conf. Biomedical Engineering and Sciences, ISBN: 1-60132-429-4, CSREA Press.
Mao et al., "Evaluation and clinical application of a commercially available iterative reconstruction algorithm for CBCT-Based IGRT", Technology in Cancer Research and Treatment, vol. 18, 2019, pp. 1-10.
Maspero et al., "Dose evaluation of fast synthetic-CT generation using a generative adversarial network for general pelvis MR-only radiotherapy", arXiv:1802.06468v2 [physics.med-ph], Aug. 16, 2018.
Brock et al., "Reconstruction of a cone-beam CT image via forward iterative projection matching", Med. Phys. vol. 37, No. 12, Dec. 2010, pp. 6212-6220.
Lu et al., "Reconstructing Cone-beam CT with Spatially Varying Qualities for Adaptive Radiotherapy, a Proof-of-Principle Study", Phys. Med. Biol., Oct. 21, 2014, vol. 59, No. 20, pp. 6251-6266.
Thaler et al., "Volumetric Reconstruction from a Limited Number of Digitally Reconstructed Radiographs Using CNNs", Proceedings of the OAGM Workshop, 2018, DOI: 10.3217/978-3-85125-603-1-05.
Jia et al., "GPU-based Iterative Cone Beam CT Reconstruction Using Tight Frame Regularization", download Mar. 2020.
Fogliata et al., "Dosimetric evaluation of Acuros XB Advanced Dose Calculation algorithm in heterogeneous media", Radiation Oncology, 2011, 6:82.
Kida et al., "Visual enhancement of Cone-beam CT by use of CycleGAN", arXiv:1901.05773v3 [cs.CV] Nov. 26, 2019.
Campello et al., "Combining Multi-Sequence and Synthetic Images for Improved Segmentation of Late Gadolinium Enhancement Cardiac MRI", arXiv:1909.01182v2 [eess.IV] Jan. 13, 2020.
Zheng et al., "A Full Stage Data Augmentation Method in Deep Convolutional Neural Network for Natural Image Classification", Hindawi, Discrete Dynamics in Nature and Society, vol. 2020, Article ID 4706576.
Shorten et al., "A survey on Image Data Augmentation for Deep Learning", Journal of Big Data, 2019, 6:60.
Eaton-Rosen et al., "Improving Data Augmentation for Medical Image Segmentation", 1st Conference on Medical Imaging with Deep Learning (MIDL 2018), Amsterdam, Netherlands.
Brion et al., "Using planning CTs to enhance CNN-based bladder segmentation on Cone Beam CT", download Mar. 2020.
Mille et al., "Comparison of normal tissue dose calculation methods for epidemiological studies of radiotherapy patients", J Radiol Prot., Jun. 1, 2018, vol. 38, No. 2, pp. 775-792.
Leger et al., "Cross-Domain Data Augmentation for Deep-Learning-Base Male Pelvic Organ Segmentation in Cone Beam CT", Applied Sciences, 2020, 10, 1154.
Jue Jiang et al., "Cross-modality (CT-MRI) prior augmented deep learning for robust lung tumor segmentation from small MR datasets", Medical Physics Wiley USA, vol. 46, No. 10, Oct. 2019, pp. 4392-4404.
Jordan et al., "Physics-based data augmentation for deep learning organ segmentation", 19th International Conference on the Use of Computers in Radiation Therapy, Jun. 17, 2019, URL:http://iccr-mcma.org/ICCR_MCMA_AbstractDocs.pdf.
International Search Report and Written Opinion dated Jun. 30, 2021, in International Application No. PCT/EP2021/057963.
International Preliminary Report on Patentability and Written Opinion dated Sep. 29, 2022, in International Application No. PCT/EP2021/057963.

* cited by examiner

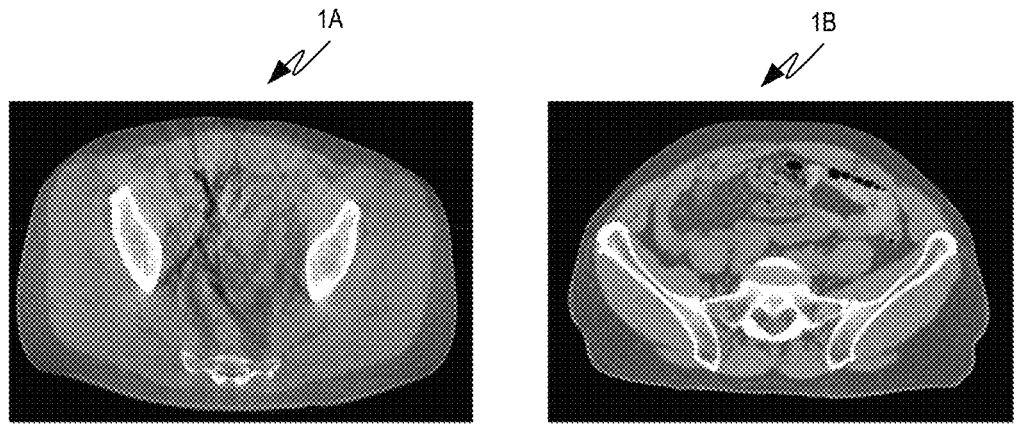
FIG. 1A     FIG. 1B
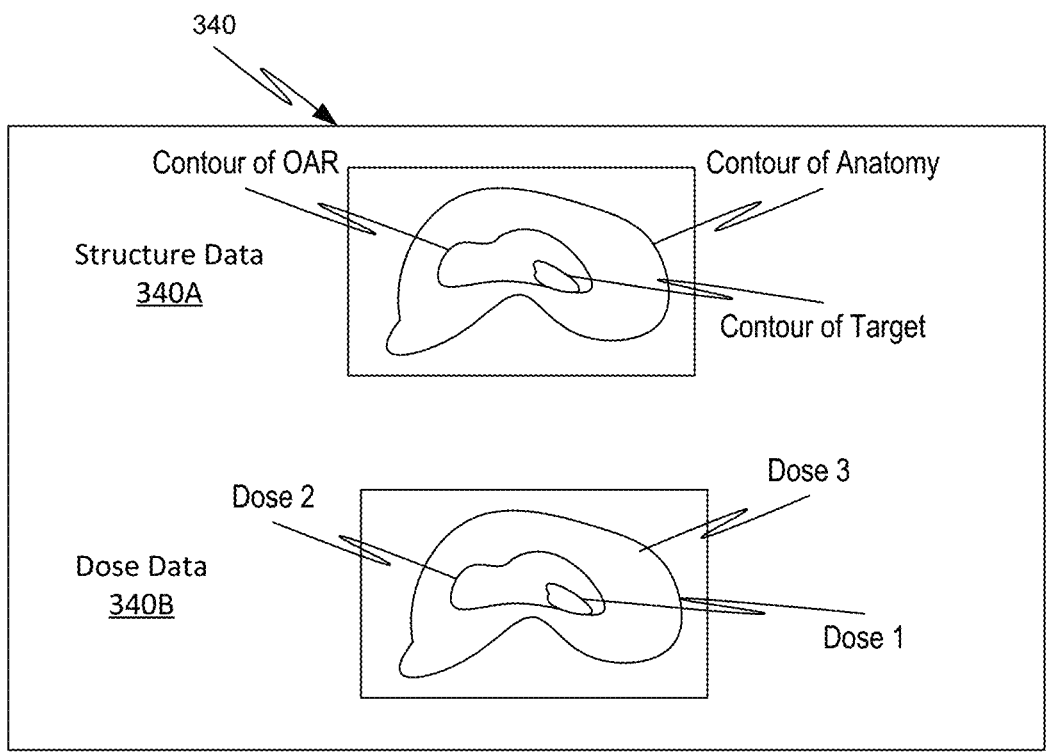
FIG. 7

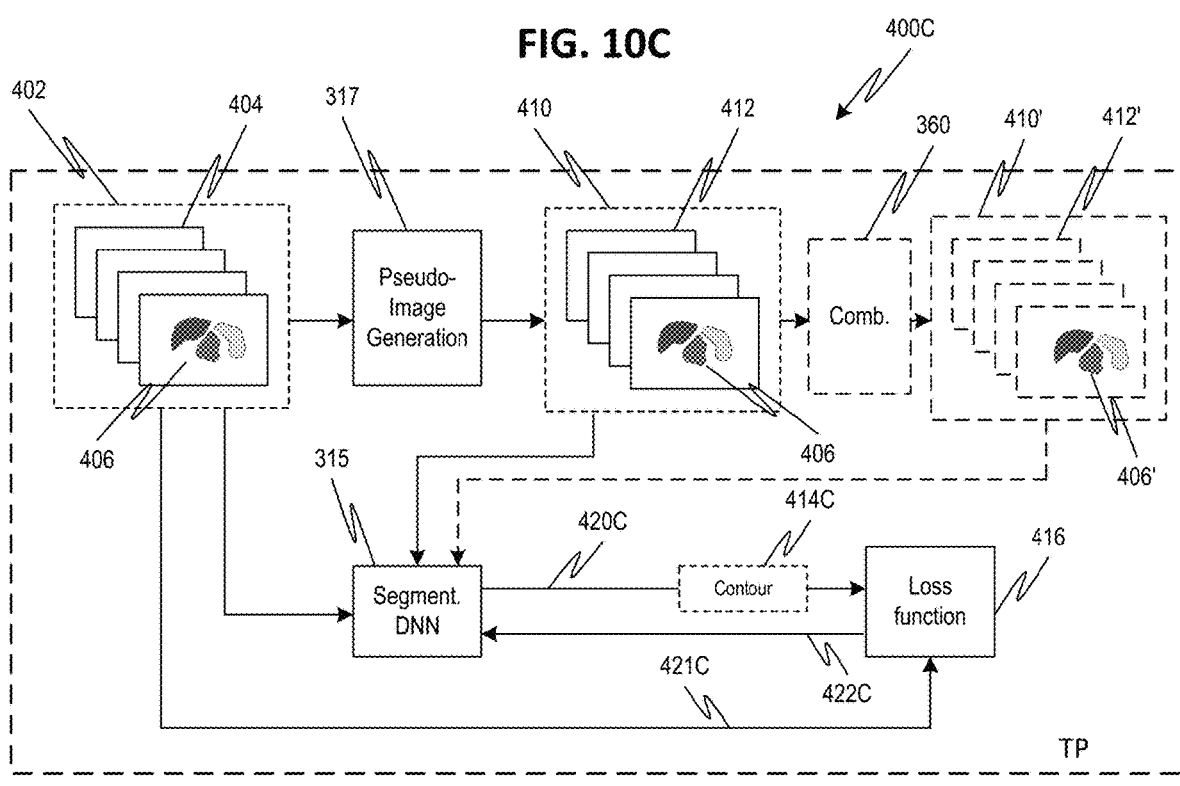

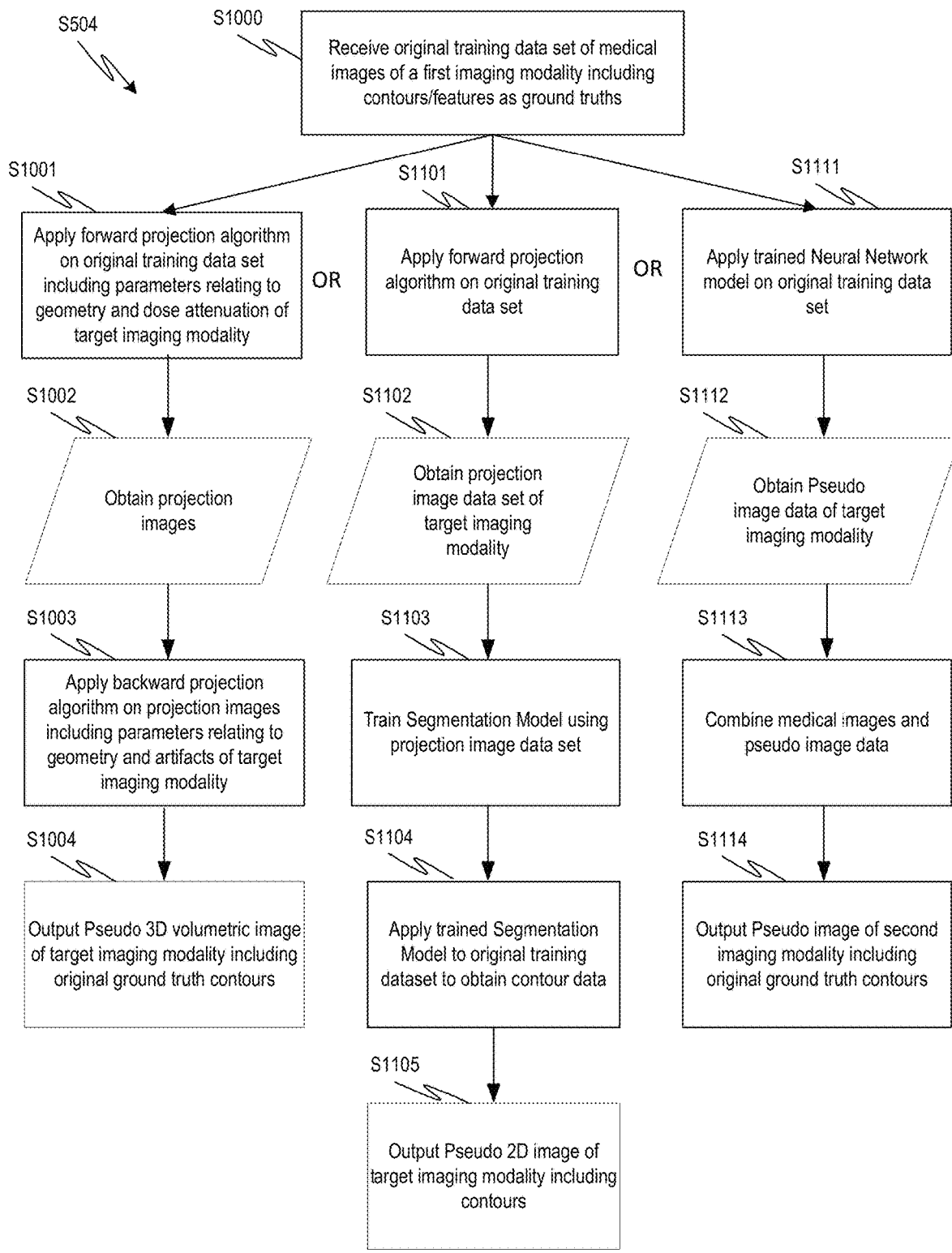

SYSTEMS AND METHODS FOR PSEUDO IMAGE DATA AUGMENTATION FOR TRAINING MACHINE LEARNING MODELS

FIELD

The present disclosure relates generally to medical imaging, and more particularly, to systems and methods for augmenting a training data set with annotated pseudo images for training machine learning models.

BACKGROUND

Radiotherapy is an important tool for the treatment of cancerous tumors in patients. Unfortunately, ionizing radiation applied to treat the patient does not inherently discriminate between tumors and proximal healthy structures (e.g., organs-at-risk). Administration of the ionizing radiation thus must be carefully tailored to restrict the applied radiation to the target (i.e., tumor) while avoiding unnecessary irradiation of surrounding anatomy, the goal being to deliver a lethal radiation dose to the tumor while maintaining an acceptable dosage to the proximal structures.

As part of the radiotherapy planning process, medical images of the tumor and surrounding anatomy are obtained. The medical images can serve as a basis for simulations of the radiation treatment and can be used to plan various aspects of the therapy, including but not limited to, beam geometry and location, radiation energy, and dosage. The medical images are typically processed to delineate target regions (e.g., pixels or voxels where a tumor or other regions desired to be irradiated are imaged) and separate surrounding structures (e.g., pixels or voxels where an organ-at-risk (OAR) or other anatomical structure to avoid being irradiated is imaged). This delineation, termed contouring or segmenting, involves defining a respective border defining outlines of the different anatomical structures in the image. However, if anatomical structures are improperly contoured in the images, this could result in insufficient irradiation of the target and/or undesirable irradiation of surrounding structures.

Manual contouring of structures in medical images can be a time-consuming phase in the radiotherapy planning process. To address this issue, automatic segmentation models, such as machine learning models, have been proposed. Machine learning generally involves extracting feature vectors from images, such as for each voxel, etc., that may be used as input to a machine learning model, such as neural networks, random forests, probabilistic models, support vector machines, and dictionary learning, for example, that classify which class each voxel belongs to.

Generally, machine learning methods involve a training phase and an inference phase. In the training phase, a machine learning model uses training data sets of medical images to generate a particular output. For example, the training data set can include 2-D or 3-D images with ground truth contours for the anatomical structures imaged by the different pixels or voxels. Training of the machine learning model involves the iterative process of adjusting weighting values, generally determined during the training process, until an input results in a desired output, at which point the machine learning model may be considered "trained."

During the inference phase, the trained machine learning model operates on medical image(s) of a patient to automatically process features of the medical image(s) to generate a particular output, such as contour data of specific anatomical structures in the medical image(s).

Since machine learning based methods are strongly dependent on the data set they train on, in order to accurately train a machine learning model, a large amount of consistently labelled (annotated) training data is required. This, however, may be problematic, especially for imaging modalities where obtaining accurately labelled training data is difficult.

For example, for imaging modalities that are not conventionally used for treatment planning, but which are used for other aspects and/or other phases of the radiotherapy treatment process (i.e., used to detect daily variations in patient anatomy and/or for patient positioning, for example), consistently labelled image training data may not be available from the clinical routine. One of the reasons for lack of such training data is because labelling of such images is very difficult due to the image quality. In such cases, segmentations are generally done on images of a different imaging modality that produce better image quality, and the contours are transferred to the planning images. Transfer between imaging modalities, however, may require image registration that may add uncertainty to the segmentation.

Another reason for lack of such training data is because images may not be readily available due to lack of clinical implementation of the imaging technique for a specific treatment region, lack of availability of a newly developed imaging equipment, or limited access to newly developed reconstruction algorithms of imaging sequences.

Cone-beam computed tomography (CBCT) is an imaging modality that serves as an example of both problems. CBCT images are not segmented routinely, and therefore are not readily available as training data. Even if they were, due to different types of artifacts, including noise, beam hardening, and scattering, for example, that are present in this imaging modality, the segmentations obtained in such images contain large uncertainties due to decreased image contrast.

As illustrated in FIGS. 1A and 1B, for example, CBCT scans are generally known to have poor soft tissue contrast. As shown in FIG. 1A, for example, in the CBCT scan 1A, there is no clear separation between the bowel tissue and the surrounding fat, whereas in the CT scan 1B of the same abdominal region, as shown in FIG. 1B, the separation is much clearer. This makes it very difficult for an observer to accurately delineate anatomical structures on CBCT scans. As a result, it is difficult to generate a large set of consistently labelled CBCT training data. Training neural networks with such scarce and/or uncertain data, however, can potentially negatively affect the training process and the obtained results.

Although data augmentation is a process that is commonly used to artificially increase the size of a training data set by generating additional training data from the existing one, applying conventional data augmentations, such as data warping or oversampling, for example, on inaccurately labelled training images will only provide additional inaccurately labelled images. On the other hand, applying conventional data augmentation on a training data set of a different imaging modality, such as computed tomography (CT) scans, for example, will not provide accurate segmentation data for CBCT scans, since the augmented CT scans do not reproduce appearance that is typical for a CBCT target imaging modality, such as artifacts that are typical for the CBCT imaging modality.

Embodiments of the disclosed subject matter may address one or more of the above-noted problems and disadvantages, among other things.

SUMMARY

Embodiments of the disclosed subject matter provide systems and methods for augmenting a training data set with pseudo (synthetic) images that provide a realistic model of the interaction of image generating signals with the patient, while also providing a realistic patient model.

Embodiments of the disclosed subject matter provide systems and methods for training a machine learning model using the augmented training data set.

Embodiments of the disclosed subject matter provide systems and methods for training a machine learning model using the augmented training data set for feature learning and/or pattern analysis and/or classification and/or segmentation.

In exemplary embodiments, the machine learning model is one of a segmentation model and a diagnostic model, the segmentation model being trained to generate contours in medical images, and the diagnostic model being trained to detect a feature representative of a medical condition in the medical images and to predict a condition, such as the presence of a disease, from the medical images.

In exemplary embodiments, the segmentation model is a neural network model, and the diagnostic model is one of a random forest classifier, a probabilistic model, a dictionary learning model, and a support vector model.

Embodiments of the disclosed subject matter provide systems and methods for training a deep learning based neural network model (DNN) using the augmented training data set.

Embodiments of the disclosed subject matter further provide systems and methods for training the deep learning based neural network model (DNN) using the augmented training data set to generate contours on images of a target imaging modality.

Embodiments of the disclosed subject matter further provide systems and methods for training the diagnostic model (i.e., one of a random forest classifier and/or the probabilistic model and/or support vector model, for example) using the augmented training data set to detect the presence of anatomical abnormalities and/or diseases in medical images.

In exemplary embodiments the augmented training data set includes an original training data set and a supplemental training data set, the supplemental training data set including pseudo (synthetic) images generated from the original training data set.

Embodiments of the disclosed subject matter further provide systems and methods for augmenting a training data set of a first imaging modality with pseudo (synthetic) images that provide realistic image and segmentation data for a target imaging modality. The target imaging modality may be different from the first imaging modality.

Embodiments of the disclosed subject matter further provide systems and methods for training a segmentation DNN model to generate contours on images of a target imaging modality using a training data set that includes an original training data set and a supplemental training data set generated from the original training data set, the supplemental training data set providing realistic image and segmentation data for the target imaging modality.

Embodiments of the disclosed subject matter further provide systems and methods for training a machine learning algorithm to detect the presence of abnormalities in images of a target imaging modality using a training data set that includes an original training data set and a supplemental training data set generated from the original training data set, the supplemental training data set providing realistic image and diagnostic data for the target imaging modality.

Embodiments of the disclosed subject matter further provide systems and methods for training a machine learning model to detect the presence of an abnormality and/or disease in images of a target imaging modality using a training data set that includes an original training data set and a supplemental training data set generated from the original training data set, the supplemental training data set providing realistic image and diagnostic data for the target imaging modality.

In exemplary embodiments, the supplemental training data set includes pseudo (synthetic) images generated from the original training data set.

In exemplary embodiments, the original training data set includes original training images of a first imaging modality, and the generated pseudo images include images of a second (target) imaging modality.

In exemplary embodiments, the pseudo images contain the same ground truths as the original training images.

In exemplary embodiments, the pseudo images contain contours as the ground truth.

In exemplary embodiments, the pseudo images contain features associated with a disease and/or anatomical abnormality as the ground truth.

Embodiments of the disclosed subject matter also provide systems and methods for generating the pseudo images.

In exemplary embodiments, the generating of the pseudo images includes at least a forward projection step or a forward and backward projection step to generate projection images from images of the original training data set, and to reconstruct the projection images into a pseudo 3D volume or pseudo 2D scans, taking into consideration radiation dose attenuation and reconstruction artifacts specific to the target imaging modality.

Alternatively, the generating of the pseudo images includes using a neural network trained to predict a pseudo image of a target imaging modality based on images of a first imaging modality.

Embodiments of the disclosed subject matter also provide for a system comprising: one or more data storage devices storing at least one neural network model, the neural network model having been trained to approximate a contour of an anatomical structure; and one or more processors operatively coupled to the one or more data storage devices and configured to employ the at least one neural network model to process one or more medical images of a patient of a target imaging modality to generate one or more contours of anatomical structures in the medical images of the patient, wherein the one or more processors are further configured to train the neural network model to approximate contours of anatomical structures using a first data set of medical images and a second data set of medical images, the medical images of the first data set including medical images of a first imaging modality, and the medical images of the second data set including pseudo medical images of the target imaging modality, the one or more processors being further configured to generate the pseudo medical images of the second data set from corresponding medical images of the first data set.

Embodiments of the disclosed subject matter also provide for a system comprising: one or more data storage devices storing at least one machine learning model, the machine learning model having been trained to detect the presence of abnormalities and/or disease; and one or more processors operatively coupled to the one or more data storage devices and configured to employ the at least one machine learning model to process one or more medical images of a patient of a target imaging modality to generate a diagnostic outcome, wherein the one or more processors are further configured to train the machine learning algorithm to detect the presence of abnormalities and/or disease using a first data set of medical images and a second data set of medical images, the medical images of the first data set including medical images of a first imaging modality, and the medical images of the second data set including pseudo medical images of the target imaging modality, the one or more processors being further configured to generate the pseudo medical images of the second data set from corresponding medical images of the first data set.

Embodiments of the disclosed subject matter also provide for a non-transitory computer-readable storage medium upon which is embodied a sequence of programmed instructions, and a computer processing system that executes the sequence of programmed instructions embodied on the computer-readable storage medium to cause the computer processing system to train a neural network model to approximate contours of anatomical structures using a first data set of medical images and a second data set of medical images, the medical images of the first data set including medical images of a first imaging modality, and the medical images of the second data set including pseudo medical images of a second imaging modality, generate the pseudo medical images of the second data set from corresponding medical images of the first data set; and process one or more medical images of a patient using the trained neural network model to generate one or more contours of anatomical structures in the medical images of the patient.

Embodiments of the disclosed subject matter also provide for a non-transitory computer-readable storage medium upon which is embodied a sequence of programmed instructions, and a computer processing system that executes the sequence of programmed instructions embodied on the computer-readable storage medium to cause the computer processing system to train a machine learning model to detect abnormalities and/or disease using a first data set of medical images and a second data set of medical images, the medical images of the first data set including medical images of a first imaging modality, and the medical images of the second data set including pseudo medical images of a second imaging modality; generate the pseudo medical images of the second data set from corresponding medical images of the first data set; and process one or more medical images of a patient using the trained neural network model to generate a diagnostic output for the patient.

In exemplary embodiments, the execution of the sequence of programmed instructions can further cause the computer processing system to generate the pseudo images of the second imaging modality using one of a forward projection technique, a forward projection coupled with a backward projection technique, and a trained neural network technique, wherein the forward projection technique includes generating projection images from the medical images of the first data set by generating a volumetric image from the first set of medical images and simulating radiation passing through the volumetric image, wherein the backward projection technique includes reconstructing the projection images into a pseudo volumetric image of the medical images of the second data set, wherein the reconstructing of the projection images includes accumulating the projection images onto a pseudo 3D volume, and generating the pseudo medical images of the second data set from the pseudo volumetric image, and wherein the neural network technique includes using a second neural network trained to predict a pseudo image of a second imaging modality based on an image of a first imaging modality.

Objects and advantages of embodiments of the disclosed subject matter will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. These drawings are for illustration purposes only and are not intended to limit the scope of the present disclosure in any way. Where applicable, some features may not be illustrated to assist in the illustration and description of underlying features. Throughout the figures, like reference numerals denote like elements. As used herein, various embodiments can mean one, some, or all embodiments.

FIGS. 1A-1B are illustrations of exemplary CBCT and CT scans of an abdominal region of a patient.

FIG. 7 is a simplified schematic diagram of structure and dose data obtained during radiotherapy treatment processing, according to various embodiments of the disclosed subject matter.

FIGS. 10A-10D are simplified schematic diagrams of operation of a neural network model during a training phase, according to various embodiments of the disclosed subject matter.

FIG. 13 is a process flow diagram for generalized pseudo image generation processes, according to various embodiments of the disclosed subject matter.

DETAILED DESCRIPTION

In operation, a machine learning based model involves a training phase (TP) and an inference phase (IP). In the training phase, the machine learning model uses training data sets of medical images to generate a particular output (e.g., generate contours, detect anatomic anomalies, etc.), and in the inference phase, the trained model operates on a medical image set containing medical images of a new patient to automatically process learned features of the medical image(s), such as determining contours of unknown anatomical structures in the image(s), and/or detect anatomic anomalies, and/or features relating to a specific disease and/or to classify the detected anomalies/features, etc.

Operation of a machine learning model for segmentation, such as a deep neural based (DNN) segmentation model is shown in FIGS. 2A-2D, for example. As used herein, the terms "deep learning model" or "deep neural network model" refer to a class of computer-based machine-learning algorithms that utilize many layers or stages (in particular, at least two "hidden" layers between input and output layers) of data processing for feature learning, pattern analysis, and/or classification. In general, these DNN models are formed by a layered network of processing elements (referred to as neurons or nodes) that are interconnected by connections (referred to as synapses or weights). The layers of nodes are trained from end-to-end (i.e., from input layer to output layer) to extract feature(s) from the input and classify the feature(s) to produce an output (e.g., classification label or class).

Figure 3:
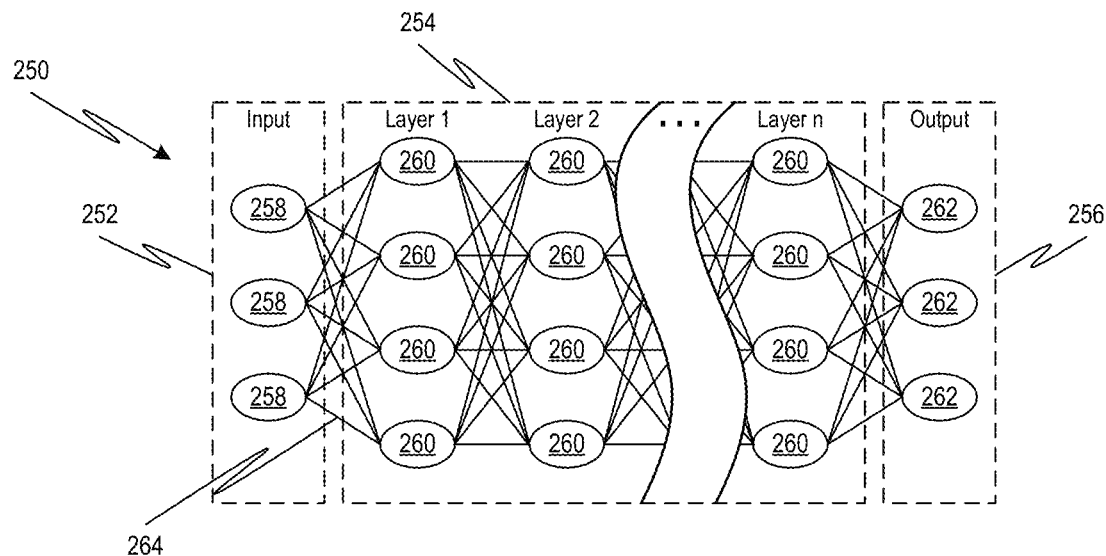
FIG. 3 is a simplified node map of a deep neural network, according to various embodiments of the disclosed subject matter.

FIG. 3 illustrates a simplified node map 250 for an exemplary DNN model. The DNN model includes a stack of distinct layers (vertically oriented in FIG. 3) that transform an input (provided to the nodes 258 of input layer 252) into an output (at nodes 262 of output layer 256). The intervening layers (Layer 1 through Layer n) between the input layer 252 and output layer 256 are referred to as "hidden" layers 254. At least two hidden layers are provided in order for the neural network to be considered "deep." Each hidden layer has respective nodes 260, which perform a particular computation and are interconnected to nodes in adjacent layers. For example, each node 260 can include a weighting function, which provides weights to respective inputs, and an activation function, which processes the weighted inputs to generate respective outputs. The different hidden layers 254 can include, but are not limited to, final loss layers, non-linear operator layers, pooling layers, subsampling layers, upsampling layers, fully connected layers, and convolutional layers. Although FIG. 3 illustrates the hidden layers 254 as having more nodes 260 per layer than a number of the nodes 258/262 in the input 252 and output 256 layers, other numbers and configurations are also possible. The simplified map illustrated in FIG. 3 is intended to be exemplary only, and other maps based on a selected DNN (e.g., a convolutional neural network) are also possible according to one or more contemplated embodiments.

In the training phase (TP), the segmentation DNN model 20 uses training data sets 10 of medical images 11 to generate a particular output 21. For example, the training data set 10 can include two-dimensional (2-D) or three-dimensional (3-D) images 11 with ground truth contours 12 for the anatomical structures imaged by the different pixels or voxels. For training of the DNN model 20, the training data set 10 can include additional ground truth information, such as cut-off plane location and/or user-defined ROIs (e.g., bounding boxes), for example. As used herein, "training" refers to determining one or more parameters of nodes in hidden layers of the DNN model 20, for example, by an iterative process S100 illustrated in FIG. 4, that varies parameters such that the DNN model 20 output 21 more closely matches corresponding ground truth. For example, as shown in FIG. 3, nodes 260 in the hidden layer 254 can include a filter or kernel, parameters of which (e.g., kernel weight, size, shape, or structure) can be adjusted during the training process.

Figure 4:
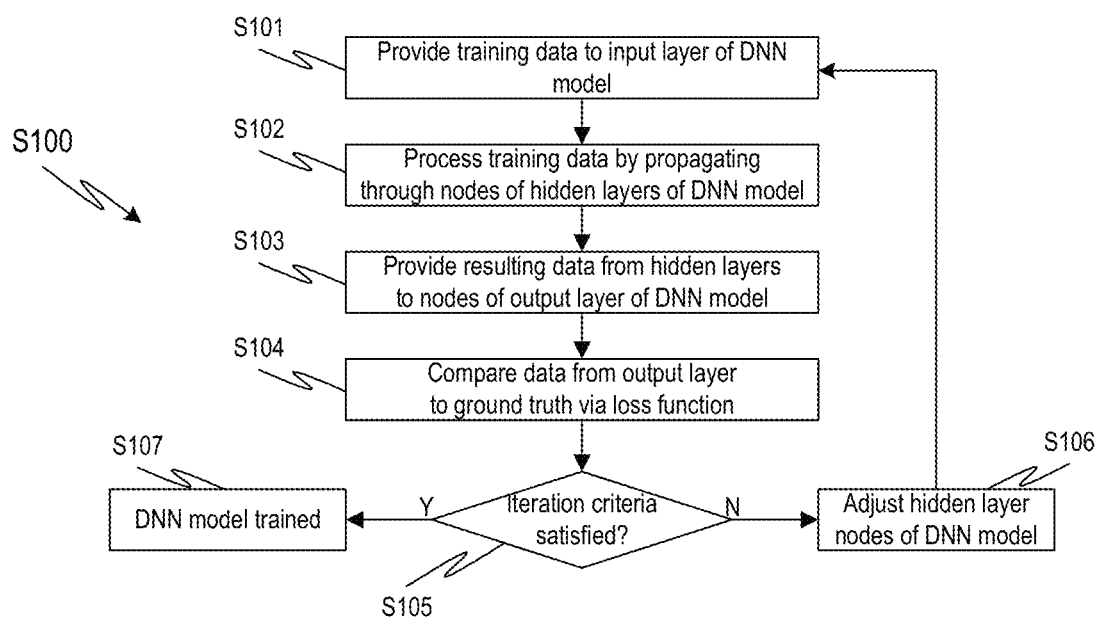
FIG. 4 is a process flow diagram for details of the training phase of a neural network model, according to various embodiments of the disclosed subject matter.

FIG. 4 illustrates the iterative model training process S100. In step S102, the training data 10 supplied in S101 is propagated through the nodes of hidden layers of an input DNN model. The resulting data from the hidden layer are provided to nodes of the output layer of the DNN mode in S103. In step S104, the data from the output layer is compared with the ground truth via a loss function 22. For example, loss function 22 can be mean-squared error, dice loss, cross entropy-based losses or any other loss function known in the art.

During the training, the DNN model is given feedback by loss function 22 on how well its output matches the correct output. Once an iteration criteria is satisfied at S105 (e.g., loss function meets a predetermined threshold, a threshold number of iterations has been reached, or no further improvement is seen between iterations), the DNN model is fixed at S107. Otherwise, the training S100 proceeds to S106, where the DNN model is modified, e.g., by adjusting parameters of the hidden layer nodes, in order to improve the match between output and the desired output. The training process S100 can iterate repeatedly until the desired iteration criteria is met at S105. The DNN model is then considered trained and the trained DNN model of S107 can be stored in an image segmentation model database.

During the inference phase (IP), the trained DNN model 20 can operate on a medical image set 30 containing medical images 31 of a new patient to automatically process features of the medical image(s) 31, such as determining contours 40 of unknown anatomical structures in the image(s) 31. The contoured image data set 50 may then be used to generate a treatment plan for the patient.

Each respective DNN model may run on a corresponding DNN engine, which refers to any suitable hardware and/or software component(s) of a computer system that is capable of executing algorithms according to any suitable deep learning model. In embodiments, the deep learning model(s) can be based on any existing or later-developed neural network, or combinations thereof. Exemplary neural networks include, but are not limited to, a convolutional neural network (ConvNet or CNN) (e.g., U-Net, deep CNN, LeNet, V-Net, AlexNet, VGGNet, Xception, DenseNet, GoogLeNet/Inception, etc.), residual neural network (ResNet), recurrent neural network (RNN) (e.g., Hopfield, Echo state, independent RNN, etc.), long short-term memory (LSTM) neural network, recursive neural network, generative adversarial neural networks (GANs), normalizing flows and graph networks, and deep belief network (DBN).

To generate the medical images (whether 2-D or 3-D) of the training sets 10 and/or of the patient set 30, any suitable medical imaging modality or modalities can be used, such as, but not limited to, X-ray, computer tomography (CT), cone beam computed tomography (CBCT), spiral CT, positron emission tomography (PET), magnetic resonance imaging (MRI), functional MRI, single photon emission computed tomography (SPECT), optical tomography, ultrasound imaging, fluorescence imaging, radiotherapy portal imaging, or any combinations thereof. For example, image data may include a series of 2-D images or slices, each representing a cross-sectional view of the patient's anatomy. Alternatively, or additionally, image data may include volumetric or 3-D images of the patient, or a time series of 2-D or 3-D images of the patient.

As discussed above, for certain imaging modalities, training a segmentation model to generate contours in patient images is difficult, because there is either no accurate training data available, or because augmenting the available training data does not provide both realistic image and segmentation data. In particular, augmented data obtained through the conventional augmentation processes does not reproduce features which are typical for the image acquisition mode or acquisition device used for imaging the patient, and therefore does not provide a realistic (i.e., physical) model of the interaction of image generating signals with the patient while also providing a realistic patient model created from the original training data set.

Figure 5:
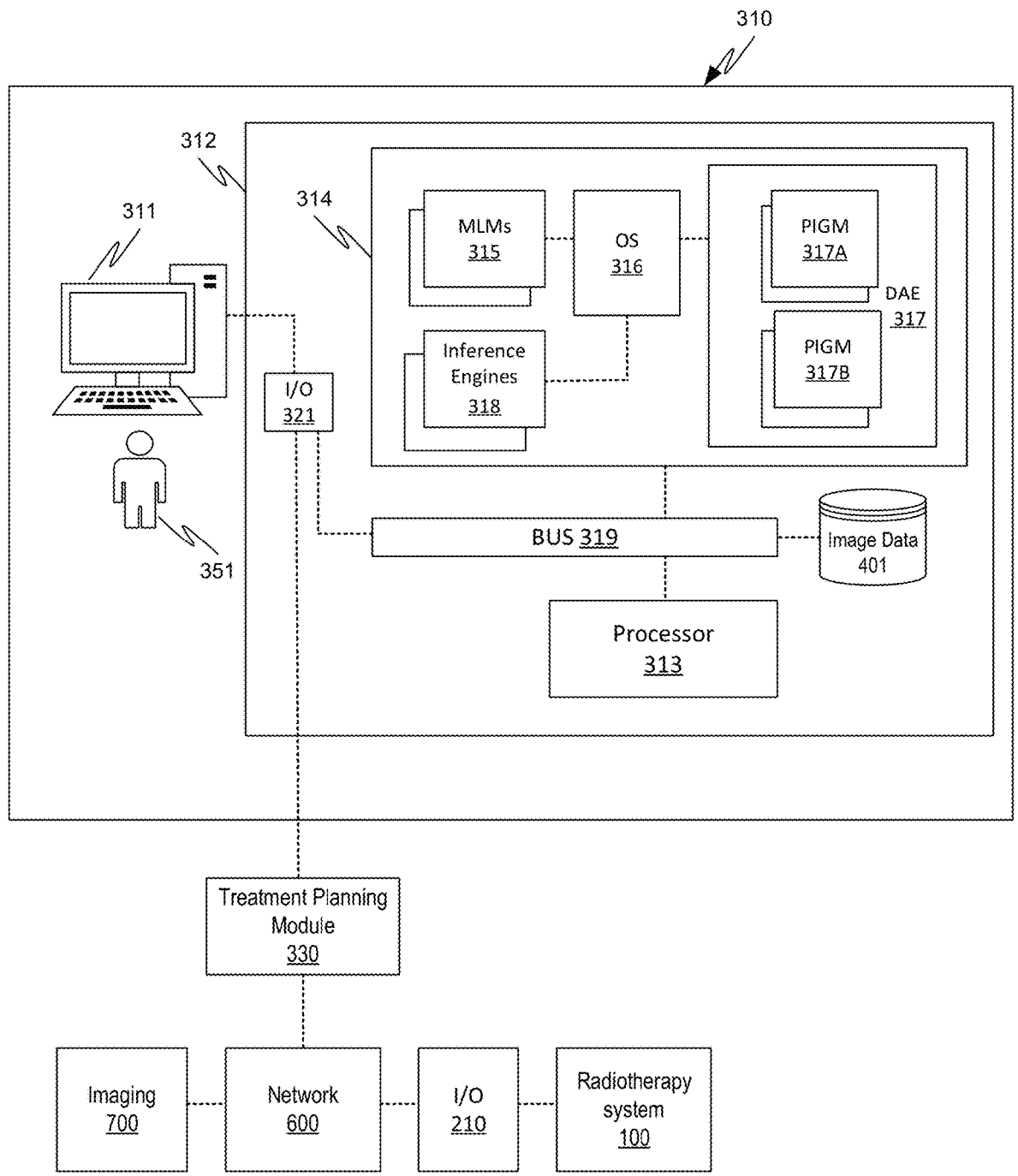
FIG. 5 a simplified schematic diagram illustrating aspects of a medical image processing systems, according to various embodiments of the disclosed subject matter.

FIG. 5 illustrates aspects of a computer infrastructure 310 that can provide a solution to one or more of these issues. For example, the computer infrastructure 310 is configured to augment an original training data set with pseudo (synthetic) images that provide a realistic model of the interaction of image generating signals with the patient, while also providing a realistic patient model.

The computer infrastructure 310 is further configured to train machine learning based models 315 (i.e., training phase), including, but not limited to, segmentation models (segmentation DNNs) and diagnostic models/classifiers (random forest, support vector, etc.), to generate contours on patient images and/or detect and/or to predict anatomic anomalies and/or diseases (i.e., inference phase) using a training data set that is augmented with pseudo (synthetic) images that provide a realistic model of the interaction of image generating signals with the patient, while also providing a realistic patient model.

The computer infrastructure 310 can further provide for training of a segmentation DNN model 315 to generate contours on images of a target imaging modality using a training data set that includes an original training data set of a first imaging modality and a supplemental training data set of a second imaging modality generated from the original training data set, the supplemental training data set providing realistic image and segmentation data for the target imaging modality. The supplemental training data set includes pseudo (synthetic) images (scans) generated from the original training data set, which contain the same ground truth contours as the original training images.

The computer infrastructure 310 can further provide for training of a diagnostic classifier 315 to detect and/or predict anatomic anomalies and/or diseases from images of a target imaging modality using a training data set that includes an original training data set of a first imaging modality and a supplemental training data set of a second imaging modality generated from the original training data set, the supplemental training data set providing realistic image and patient data for the target imaging modality. The supplemental training data set includes pseudo (synthetic) images (scans) generated from the original training data set, which contain the same ground truths as the original training images.

The computer infrastructure 310 can also provide procedures to develop, train and utilize artificial intelligence (AI) or other processing techniques to generate the supplemental/pseudo training data set.

In exemplary embodiments, the generating of the supplemental training data set includes generating one or more pseudo (synthetic) images from the original training data set, the one or more pseudo images corresponding or representing images of the target imaging modality. The generated one or more pseudo images depict the same anatomical features as those present in the original training data set and the same ground truths as those present in the original training data set as if they were in images of the target imaging modality.

In exemplary embodiments, the original training data set includes image data of a first imaging modality, the first imaging modality being different from the target imaging modality.

In exemplary embodiments, the generating of the pseudo images includes at least a forward projection step or a forward and backward projection step to generate projection images from images of the original training data set, and to reconstruct the projection images into a pseudo 3D volume or pseudo 2D scans, taking into consideration radiation dose attenuation as well as reconstruction artifacts specific to the target imaging modality. In exemplary embodiments, the generating of the pseudo images includes using a neural network trained to predict a pseudo image of a target imaging modality based on images of a first imaging modality.

Figure 6:
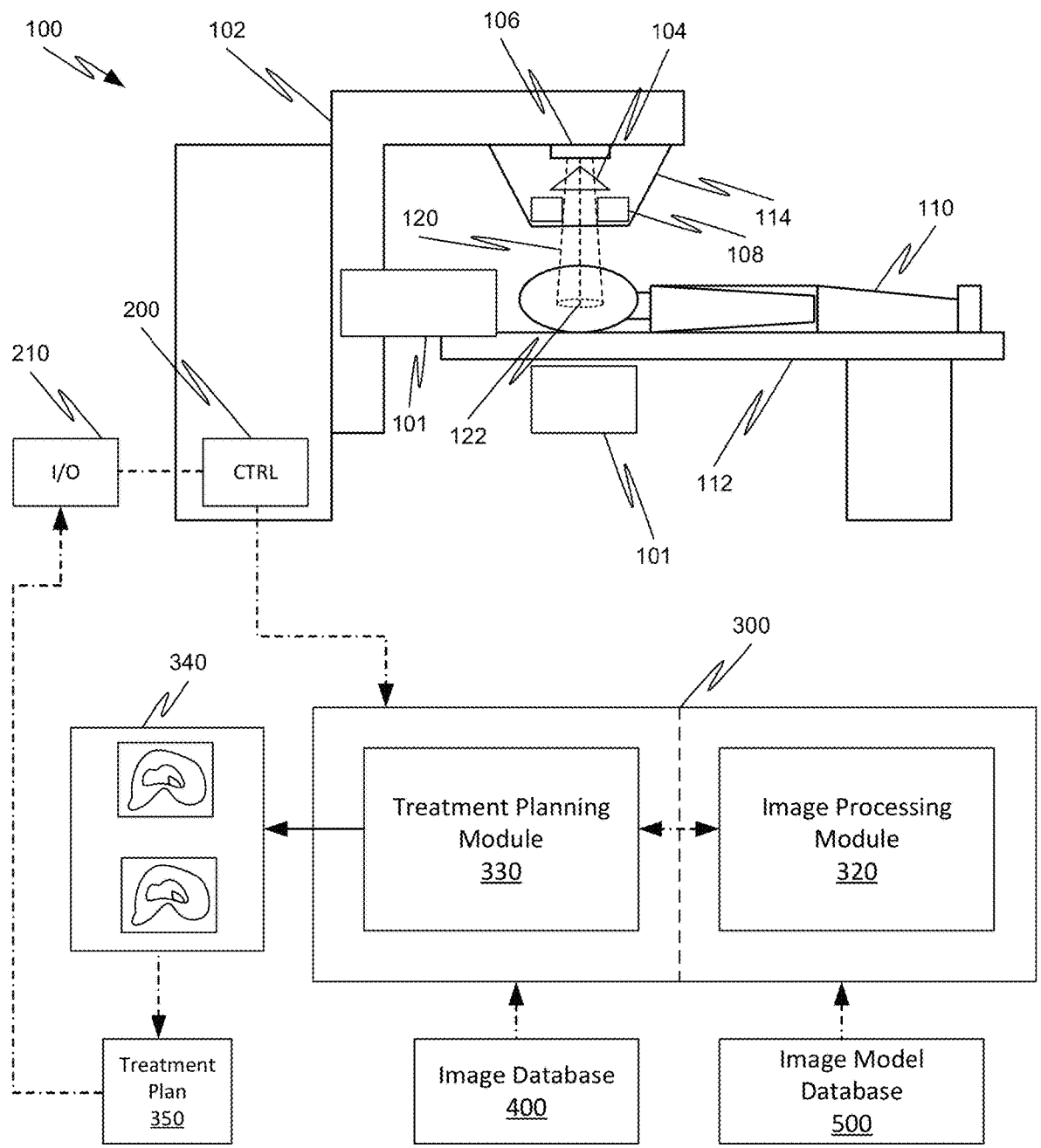
FIG. 6 illustrates aspects of a radiation therapy system, according to various embodiments of the disclosed subject matter.

The computer infrastructure 310 can be a treatment planning device, such as the treatment planning device 300 shown in FIG. 6, for example, that is configured to perform any suitable number of treatment planning tasks or steps, such as segmentation, dose prediction, projection data prediction, treatment plan 350 generation, etc. The treatment planning device 300 may include an image processing module 320 configured to perform segmentation to generate structure data 340A identifying various anatomical structures, such as, but not limited to, the malignant tumor (i.e., the target), and any organs-at-risk (OAR), as shown in FIG. 7, for example. The structure data 340A may also identify other anatomical structures, such as other organs, tissues, bones, blood vessels, etc. The structure data 340A may also include any suitable data relating to the contour, shape, size, and location of a patient's anatomy, the malignant tumor (i.e., the target), any organs-at-risk (OAR), and any other anatomical structures. The treatment planning device 300 may also include a treatment planning module 330, by which dose data 340B, as shown in FIG. 7, is determined specifying the radiation dose to be delivered to the target and any other anatomical structure desired to be irradiated, and specifying the maximum allowable radiation dose that is allowed to be delivered to other anatomical structures, such as the OARs, for example. The treatment plan 350 may also contain any other additional data, such as prescription, disease staging, biologic or radiomic data, genetic data, assay data, past treatment or medical history, or any combination thereof. The treatment plan 350 may also take into consideration constraints imposed on the treatment process by a radiation therapy system 100 show in FIG. 6 used for delivering the radiation to the patient 110.

When used as such, the computer infrastructure 310 is configured to automatically generate contours using trained segmentation DNN models 315 and to generate the treatment plan 350 for a patient to be executed using a radiotherapy system, such as the radiotherapy system 100 shown in FIG. 6, for example.

Alternatively, the computer infrastructure 310 can include an image processing module, such as the image processing module 320 shown in FIGS. 5 and 6, for example, to generate contours of anatomical structures of the patient on medical images using trained segmentation DNN models 315, and a treatment planning module 330 as shown in FIG. 6, for example, to generate the treatment plan 350 using the contoured medical images.

Alternatively, the computer infrastructure 310 may provide the image processing functions of the image processing module 320 to generate contours of anatomical structures of a patient, with the treatment planning module 330 being separate from the computer infrastructure 310.

In an exemplary embodiment illustrated in FIGS. 5 and 6, the computer infrastructure 310 provides the image processing functions of the image processing module 320 to generate contours of anatomical structures of a patient, and includes a computer system 312, a treatment planning module 330, a network interface 311, and an input/output device 351 operatively coupled to an input/output interface 210 of the radiotherapy system 100 via network 600, for example.

The computer system 312 can implement one or more aspects of the process of FIGS. 8-22. Although shown as a single module 312, the functionality of module 312 can be implemented as a distributed system or otherwise. Moreover, although illustrated separately, the module 312 and the treatment planning module 330 may be integrated together, for example, as a single module with both image processing and treatment planning functionality provided by memory 314, as separate parts of a common computer system 312, or as separate parts of a common system (e.g., a central or distributed processing system operating on a remote server).

The computer system 312 can include a bus 319 or other mechanism for communicating information between components. The computer system 312 can also include a processor 313, for example, a general or specific purpose processor (e.g., graphics processing unit (GPU)), coupled to bus 319. The processor 313 can be a processor of a cloud-based system, and/or a processor of one or more network or Internet host servers. The computer system 312 can include an input/output module 321, for example, a communication device such as network interface cards that provide access to network 600 to communicate with an image database 400 and/or 401, and/or an image model database 500, and/or the radiation therapy system 100, and/or an imaging device 700, and/or with input/output ports that allow a user 351 to interact with the computer system 312, for example via user input devices including a mouse, keyboard, display, etc., such as an interactive graphical user interface (GUI) 311.

The computer system 312 can also include a memory 314 that stores information and instructions to be executed by processor 313. The memory 314 can be comprised of any combination of random access memory (RAM), read only memory (ROM), static storage such as a magnetic or optical disk, or any other type of computer readable media. For example, computer readable media may be any available media that can be accessed by processor 313 and can include both volatile and nonvolatile media, removable and non-removable media, and communication media. Communication media may include computer readable instructions, data structures, program modules or other data in a modulated data signal such as a carrier wave or other transport mechanism and includes any information delivery media.

Memory 314 can store software modules that provide functionality when executed by processor 313. The modules can include, for example, an operating system 316 that can provide operating system functionality for the computer system 312, one or more inference engines 318 configured to access and/or link to a plurality of machine learning models, such as those saved in an external image model database 500 or the plurality of models 315 saved in memory 314. The memory 314 also includes a data augmentation engine (DAE) 317, which can include a plurality of first pseudo-image generations modules 317A and a plurality of second pseudo-image generation modules 317B. The first pseudo-image generation modules 317A can include hardware and/or software components that are capable of executing algorithms to generate one or more pseudo images using forward and backward projections steps, and hardware and/or software components that are capable of executing algorithms to generate one or more pseudo images using only forward projection steps. The second pseudo-image generation modules 317B can include hardware and/or software components that are capable of executing algorithms according to one or more neural network models stored in the image model database 500, and/or the memory 314, that are trained to generate pseudo images based on input images. One or more of the neural network models are trained to generate pseudo images of a second (target) imaging modality based on input images of a first imaging modality, the second imaging modality being different from the first imaging modality.

The pseudo-image generation modules 317A, 317B can receive medical image data, including training data, from image database 400, or any other internal or external image database, or from the medical imaging device 700 (i.e., planning medical images), or from the radiotherapy system 100 via network 600, or via I/O 321, and generate one or more pseudo images based on the received training data. The pseudo-image generation engines 317A, 317B are further configured to receive an original set of training data including one or more images of a first imaging modality and generate one or more pseudo images of a second, different imaging modality based on the original set of training data. The pseudo-image generation engines 317A, 317B are further configured to copy the anatomy and/or anatomical features related to an anomaly/disease and/or the contours contained in the images of the original training data set to the generated pseudo images, and therefore include the original data set anatomy and/or original features as ground truth features and/or the original data set segmentation as ground truth contours in the generated pseudo images. The generated pseudo image data set can be stored in a storage device of memory 314, or in the image database 400, or 401, or any other internal and/or external image database that are made accessible to the inference engines 318.

The inference engines 318 are modules that include hardware and/or software components that are capable of executing algorithms according to the models stored in the image model database 500, and/or the models 315 stored in the memory 314. The one or more inference engines 318 can receive medical image data (training data including original and pseudo images, projections data, or medical image(s) for inference) from image database 400, 401, or any other internal or external image database, or from the medical imaging device 700 (i.e., planning medical images), or from the radiotherapy system 100 via network 600, or via I/O 321, and generate contours for one or more anatomical structures in the received medical images based on one or more image segmentation models 315 or any other trained neural network stored in one of the model databases, and/or to detect and/or predict anatomical anomalies and/or diseases, such as but not limited to, a collapsed lung, for example, in the received medical images based on one or more diagnostic models or any other trained neural network stored in one of the model databases.

The contours generated by the computer infrastructure 310 can be processed by the treatment planning module 330 and the generated treatment plan 350 can be executed using a radiotherapy system, such as the radiotherapy system 100 shown in FIG. 6, for example.

An exemplary radiation therapy system 100 can provide radiation to a patient 110 positioned on a treatment couch 112 and can allow for the implementation of various radiation dose verification protocols. The radiation therapy can include photon-based radiation therapy, particle therapy, electron beam therapy, or any other type of treatment therapy.

In an embodiment, the radiation therapy system 100 can include a radiation treatment device 101 such as, but not limited to, a LINAC operable to generate one or more beams of megavolt (MV) X-ray radiation for treatment. The LINAC may also be operable to generate one or more beams of kilovolt (kV) X-ray radiation, for example, for patient imaging. The system 100 has a gantry 102 supporting a radiation treatment head 114 with one or more radiation sources 106 and various beam modulation elements, such as, but not limited to, flattening filter 104 and collimating components 108. The collimating components 108 can include, for example, a multi-leaf collimator (MLC), upper and lower jaws, and/or other collimating elements. The collimating components 108 and/or the flattening filter 104 can be positioned within the radiation beam path by respective actuators (not shown), which can be controlled by controller 200.

The gantry 102 can be a ring gantry (i.e., it extends through a full 360° arc to create a complete ring or circle), but other types of mounting arrangements may also be employed. For example, a static beam, or a C-type, partial ring gantry, or robotic arm can be used. Any other framework capable of positioning the treatment head 114 at various rotational and/or axial positions relative to the patient 110 may also be used.

In an embodiment, the radiation therapy device is a MV energy intensity modulated radiation therapy (IMRT) device. The intensity profiles in such a system are tailored to the treatment requirements of the individual patient. The IMRT fields are delivered with MLC 108, which can be a computer-controlled mechanical beam shaping device attached to the head 114 and includes an assembly of metal fingers or leaves. For each beam direction, the optimized intensity profile is realized by sequential delivery of various subfields with optimized shapes and weights. From one subfield to the next, the leaves may move with the radiation beam on (i.e., dynamic multi-leaf collimation (DMLC)) or with the radiation beam off (i.e., segmented multi-leaf collimation (SMLC)).

Alternatively, or additionally, the radiation therapy device 101 can be a tomotherapy device, a helical tomotherapy device, or a simplified intensity modulated arc therapy (SIMAT) device, a volumetric modulated arc therapy (VMAT) device, or a volumetric high-definition (or hyper-arc) therapy (HDRT). In effect, any type of IMRT device can be employed as the radiation therapy device 101 of system 100, and can also include an on-board volumetric imaging, which can be used to generate in-treatment image data generated during a treatment session.

Each type of radiation therapy device can be accompanied by a corresponding radiation plan and radiation delivery procedure.

The controller 200, which can be, but is not limited to, a graphics processing unit (GPU), can include a computer with appropriate hardware such as a processor, and an operating system for running various software programs and/or communication applications. The controller 200 can include software programs that operate to communicate with the radiation therapy device 101, which software programs are operable to receive data from external software programs and hardware. The computer can also include any suitable input/output (I/O) devices 210, which can be adapted to allow communication between controller 200 and a user of the radiation therapy system 100, e.g., medical personnel. For example, the controller 200 can be provided with I/O interfaces, consoles, storage devices, memory, keyboard, mouse, monitor, printers, scanner, as well as a departmental information system (DIS) such as a communication and management interface (DICOM) for storing and transmitting medical imaging information and related data and enabling the integration of medical imaging devices such as scanners, servers, workstations, printers, network hardware, etc.

Alternatively, or additionally, the I/O devices 210 can provide access to one or more networks, such as network 600, for example, for transmitting data between controller 200 and remote systems. For example, the controller 200 can be networked via I/O 210 with other computers and radiation therapy systems. The radiation therapy system 100, the radiation treatment device 101, and the controller 200 can communicate with the network 600 as well as databases and servers, for example, a dose calculation server (e.g., distributed dose calculation framework) and the treatment planning system 300. The controller 200 may also be configured to transfer medical image related data between different pieces of medical equipment.

The system 100 can also include a plurality of modules containing programmed instructions (e.g., as part of controller 200, or as separate modules within system 100, or integrated into other components of system 100), which instructions cause system 100 to perform different functions related to adaptive radiation therapy or other radiation treatment. For example, the system 100 can include a treatment plan module operable to generate the treatment plan for the patient 110 based on a plurality of data input to the system by the medical personnel, a patient positioning module operable to position and align the patient 110 with respect to a desired location, such as the isocenter of the gantry, for a particular radiation therapy treatment, an image acquiring module operable to instruct the radiation therapy system and/or the imaging device to acquire images of the patient 110 prior to the radiation therapy treatment (i.e., pre-treatment/reference images used for treatment planning and patient positioning) and/or during the radiation therapy treatment (i.e., in-treatment session images), and to instruct the radiation therapy system 100 and/or the imaging device 101 or other imaging devices or systems to acquire images of the patient 110.

The system 100 can further include a radiation dose prediction module operable to predict a dose to be delivered to the patient 110 before commencement of the radiation treatment therapy, a dose calculation module operable to calculate the actual dose delivered to the patient 110 during radiation therapy treatment, a treatment delivery module operable to instruct the radiation therapy device 100 to deliver the treatment plan to the patient 110, a correlation module operable to correlate the planning images with the in-treatment images obtained during radiation therapy, a computation module operable to reconstruct three-dimensional target volumes from in-treatment images, an analysis module operable to compute displacement measurements, and a feedback module operable to instruct the controller in real-time to stop radiation therapy based on a comparison of the calculated displacement with a predetermined threshold value (range).

The system 100 can further include one or more contour generation modules operable to generate contours of target volumes and other structures in pre-treatment (planning, reference) and in-treatment (treatment session) images, an image registration module operable to register pre-treatment images with subsequent in-treatment images, a dose calculation module operable to calculate accumulated dose, a contour propagation module operable to propagate a contour from one image to another, a contour verification module operable to verify a generated contour, a registration deformation vector field generation module operable to determine deformation vector fields (DVFs) as a result of an image deformation process. The system 100 can further include modules for electron density map generation, isodose distribution generation, does volume histogram (DVH) generation, image synchronization, image display, treatment plan generation, treatment plan optimization, automatic optimization parameter generation, updating and selection, and adaptive directives and treatment information transfer. The modules can be written in the C or C-++ programming language, for example. Computer program code for carrying out operations as described herein may be written in any programming language, for example, C or C-++ programming language.

Although the discussion of FIGS. 5 and 6 above has focused on the use of the computer infrastructure 310 with a radiotherapy system 100, embodiments of the disclosed subject matter are not limited thereto. Indeed, the computer infrastructure 310 may be provided as a separate independent system for image analysis, may be integrated with an imaging modality, may communicate with other medical treatment systems, or may be integrated with other medical treatment systems. Accordingly, embodiments of the disclosed image processing module are not limited to the specific configuration illustrated in FIG. 6 or limited to use with radiotherapy systems. Instead, in exemplary embodiments, the trained diagnostic models 315 may be used to diagnose a patient.

Figure 8:
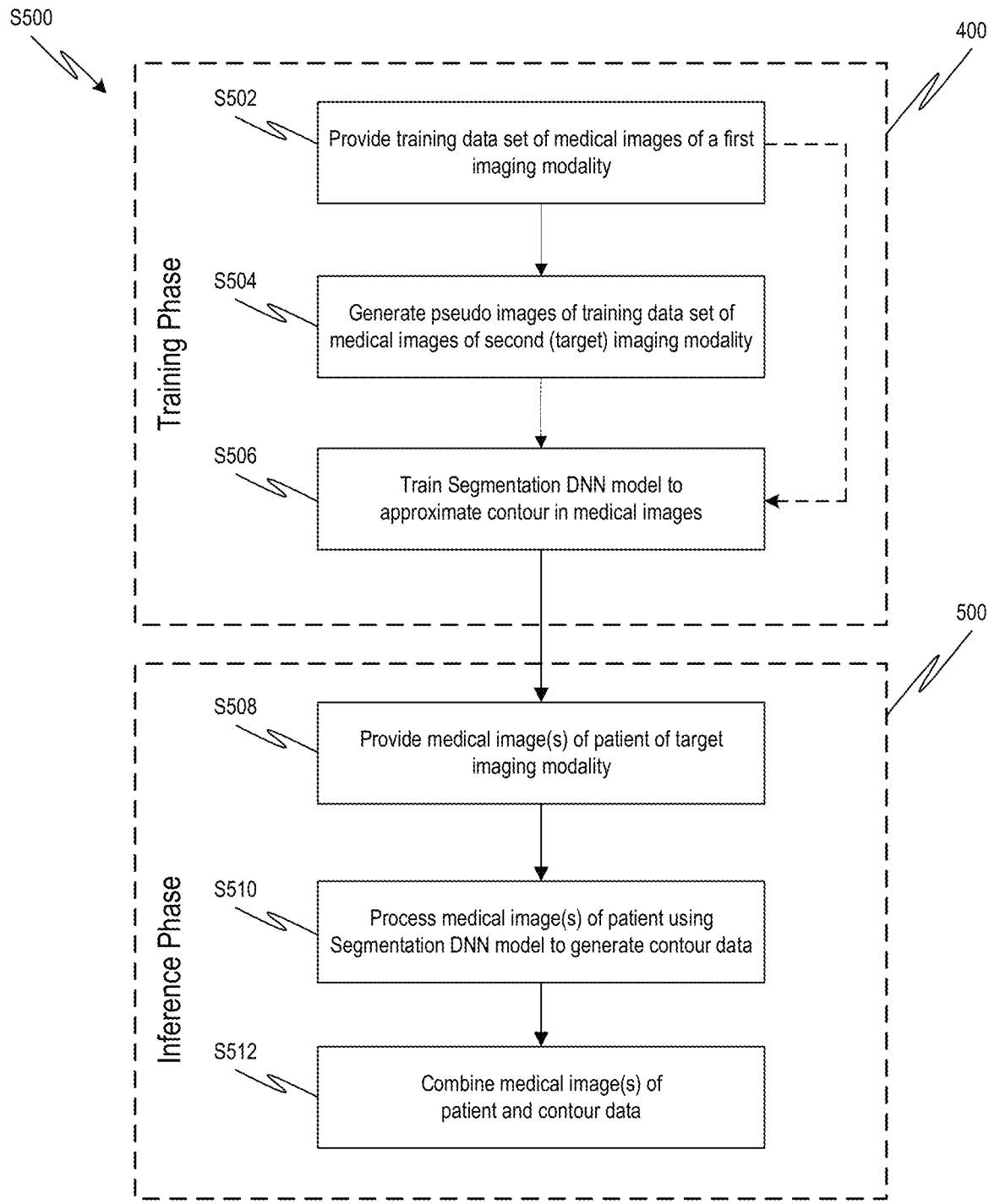
FIG. 8 is a process flow diagram for generalized training and inference phases of a neural network model, according to various embodiments of the disclosed subject matter.
Figure 9:
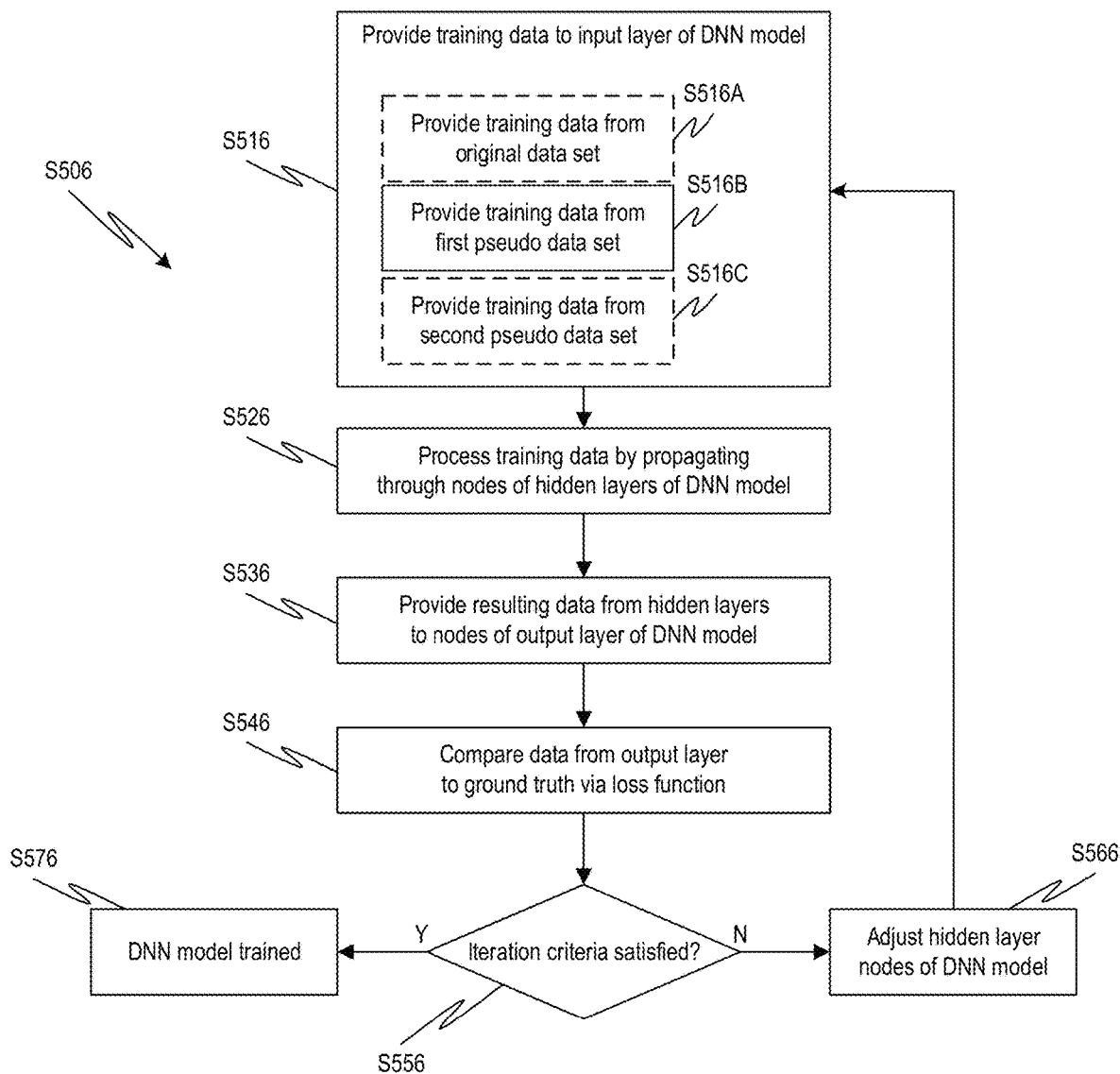
FIG. 9 is a process flow diagram for details of the training phase of the neural network model, according to various embodiments of the disclosed subject matter.
Figure 10A:
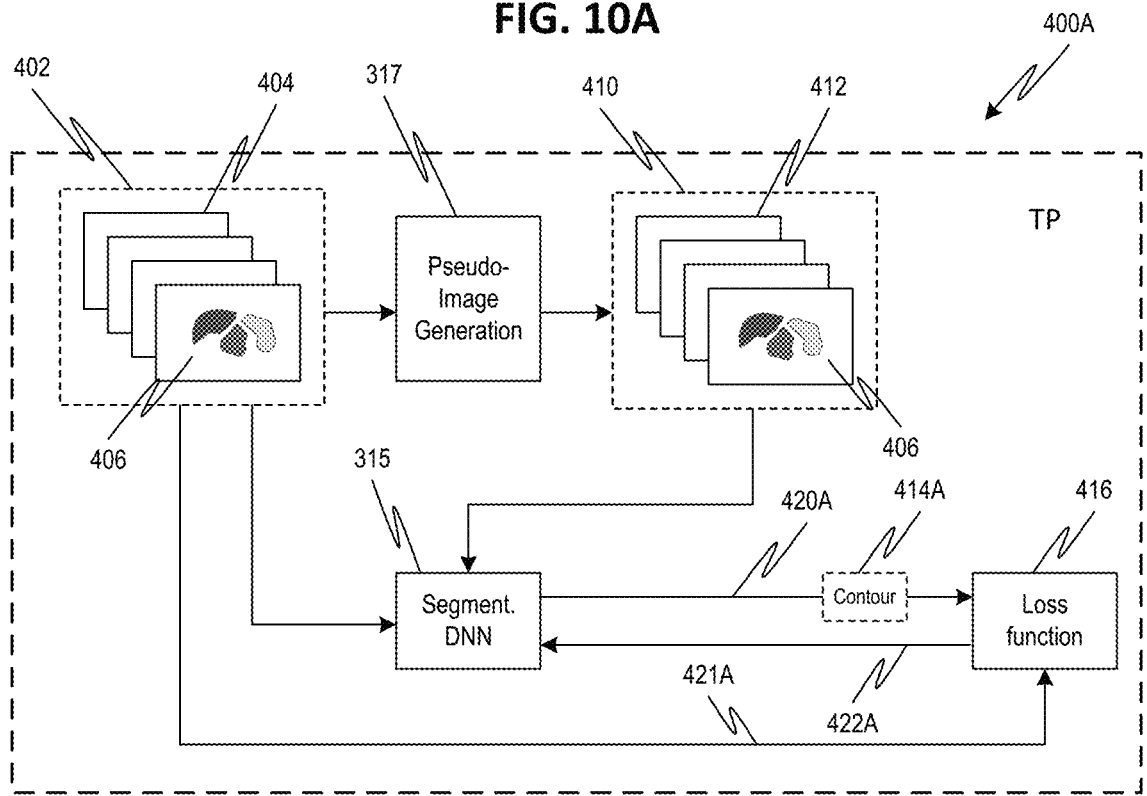
Figure 10B:
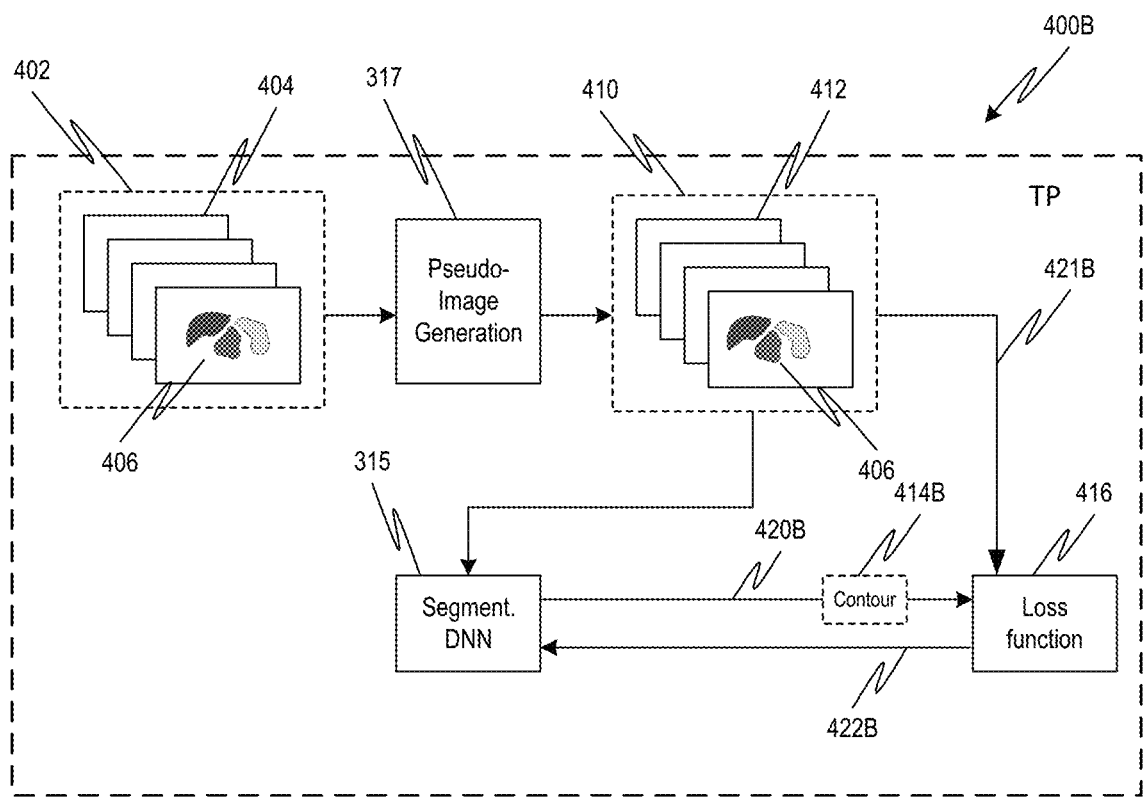

Referring to FIGS. 8-20, exemplary operations of the computer infrastructure 310 to train and apply automatic segmentation DNN models 315 will be described. FIGS. 10A-10D, and 11A-11B are schematic illustrations of the operation of a segmentation DNN models 315 during a training phase 400 (400A-400D). FIGS. 12A-12C are schematic illustrations of the operation of a segmentation DNN model 315 during an inference phase 500. FIGS. 8 and 9 are process flow diagrams of various steps performed during training 400 and inference 500 phases, FIG. 13 is a generalized process flow diagram of various augmentation processes that can be used to generate pseudo images to augment the original training data set used in the training phase 500, and FIGS. 14-20 are schematic illustrations of pseudo training data set generation steps for training data augmentation underlying the training of the segmentation DNN models 315.

The generation of automatic segmentation in a patient image by the computer infrastructure 310 can begin with process S500 shown in FIG. 8. Process S500 can start with the training phase 400, which trains a segmentation DNN model 315 on an appropriate training data set. The segmentation DNN model 315 is trained so as to generate contours of anatomical structures in patient images of a target imaging modality (i.e., CBCT images, for example).

In the training phase 400, the computer infrastructure 310 can have a setup 400A-400D as illustrated in FIGS. 10A-10D. The process S500 can begin at S502, where an original training data set 402 of medical images 404 is provided. The medical images of the original training data set, whether 2-D or 3-D images, can be of any suitable first imaging modality, such as, but not limited to, X-ray, computer tomography (CT), cone beam computed tomography (CBCT), spiral CT, positron emission tomography (PET), magnetic resonance imaging (MRI), functional MRI, single photon emission computed tomography (SPECT), optical tomography, ultrasound imaging, fluorescence imaging, radiotherapy portal imaging, or any combinations thereof. For example, image data may include a series of 2-D images or slices, each representing a cross-sectional view of the patient's anatomy. Alternatively or additionally, image data may include volumetric or 3-D images of the patient, or a time series of 2-D or 3-D images of the patient.

The original training data set 402 can also include desired output, in the form of ground truth, such as contours 406 of one or more anatomical structures, that are verified by an expert or system user. For example, the original training data 402 can be user-generated through observations and experience to facilitate supervised learning and may be extracted from past images of previous patients. Preferences of the user or facility can thus be taken into account in the processing by virtue of the user-defined training data set 402.

Figure 11A:
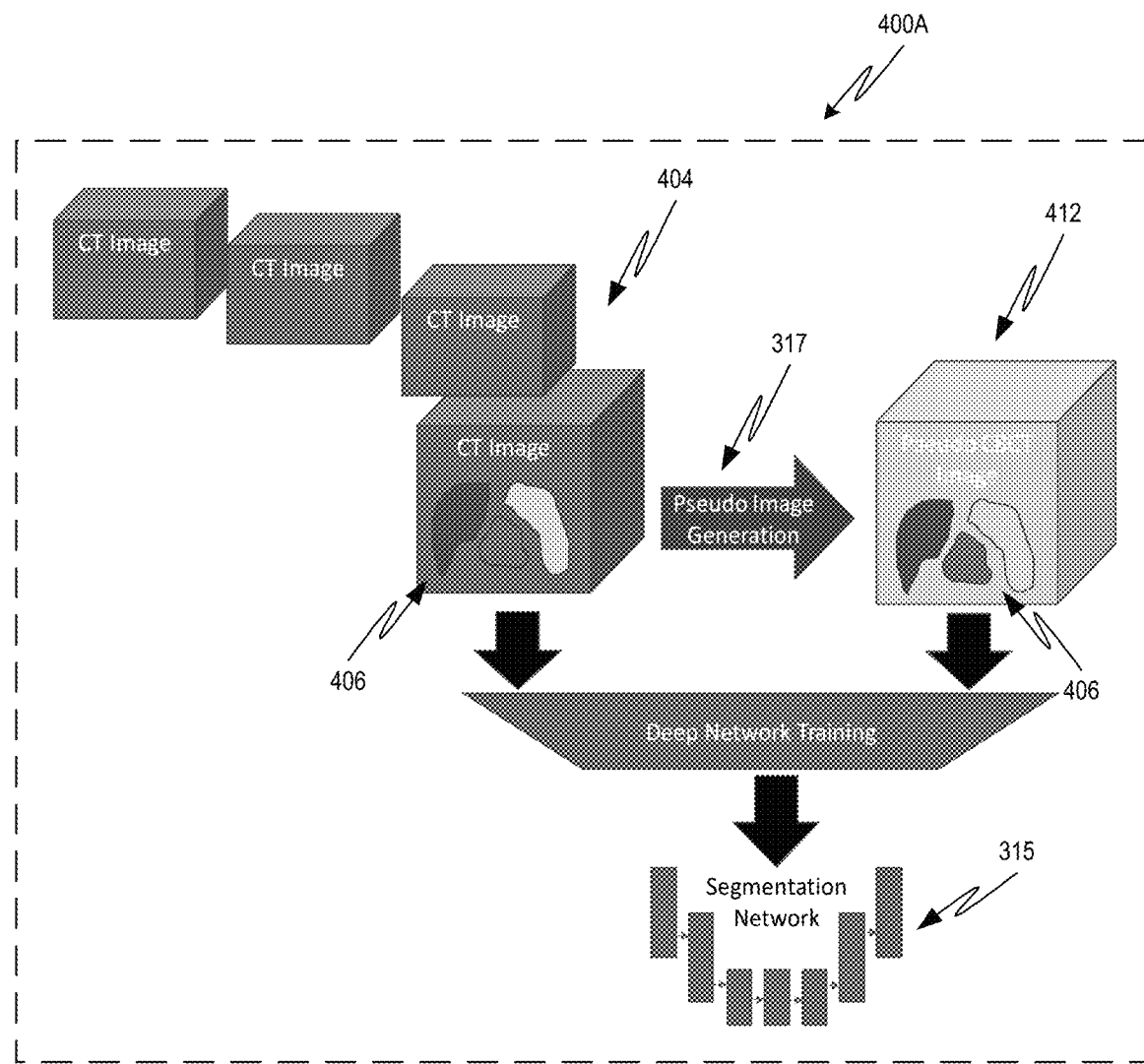
FIGS. 11A and 11B are simplified schematic diagrams of operation of a neural network model during a training phase, according to various embodiments of the disclosed subject matter.
Figure 11B:
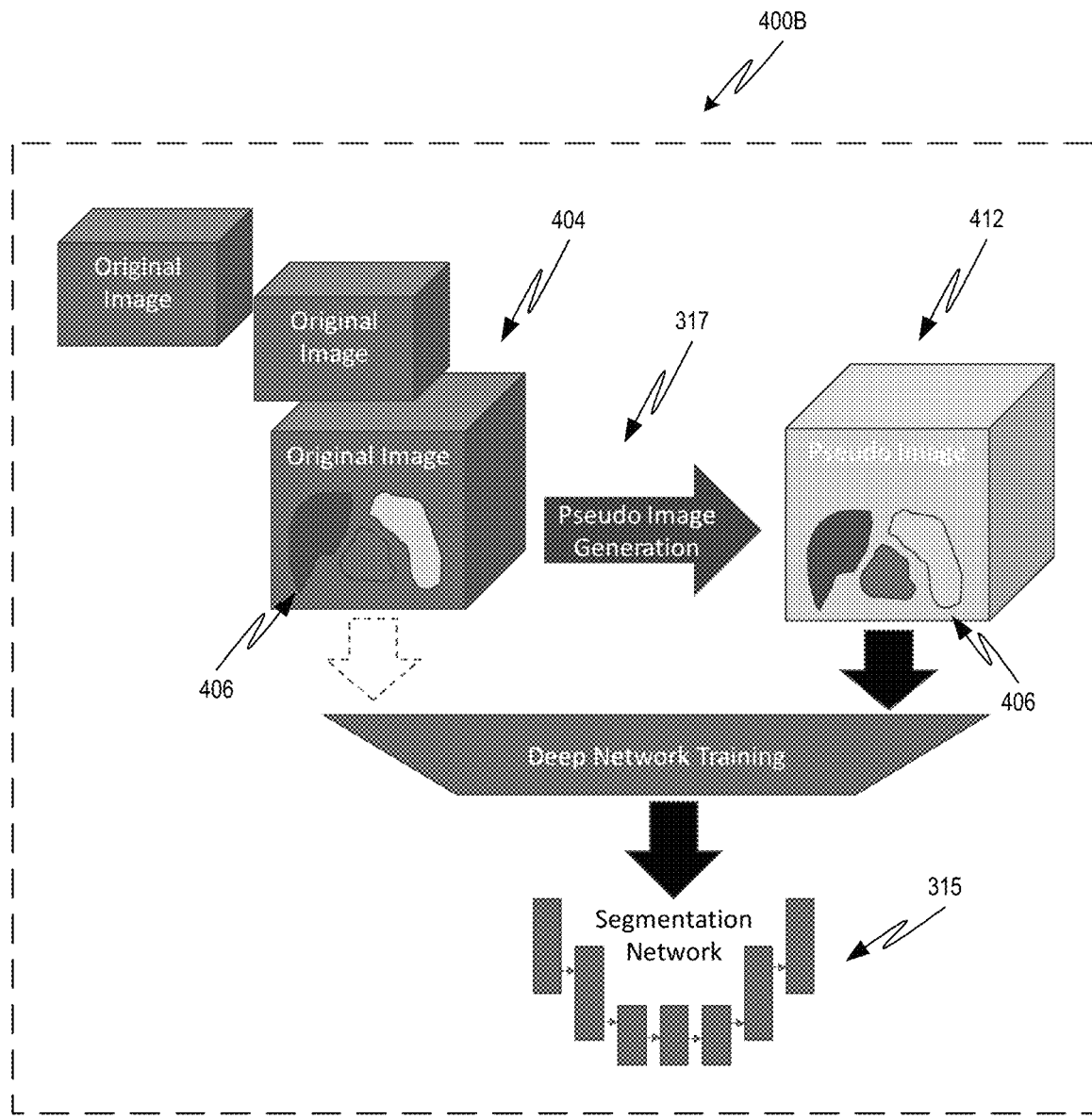
Figure 12A:
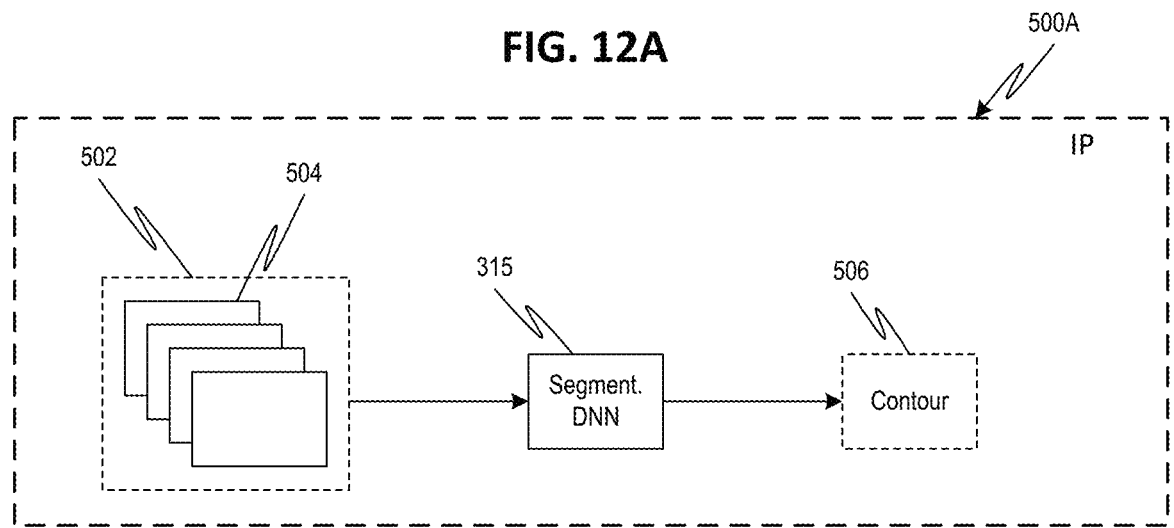
FIGS. 12A-12C are simplified schematic diagrams of operation of a neural network model during an inference phase, according to various embodiments of the disclosed subject matter.
Figure 12B:
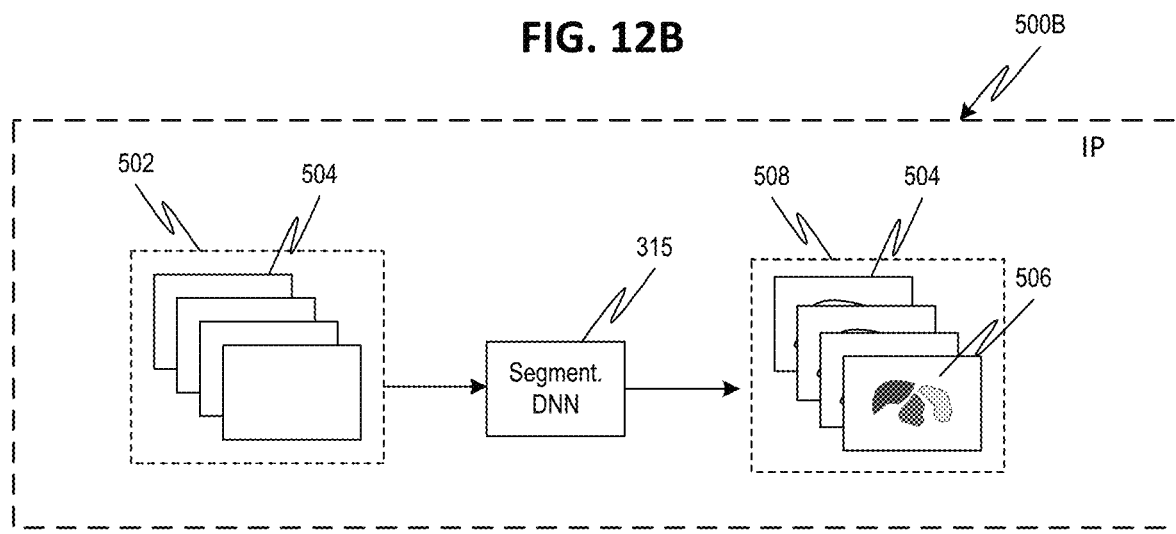
Figure 12C:
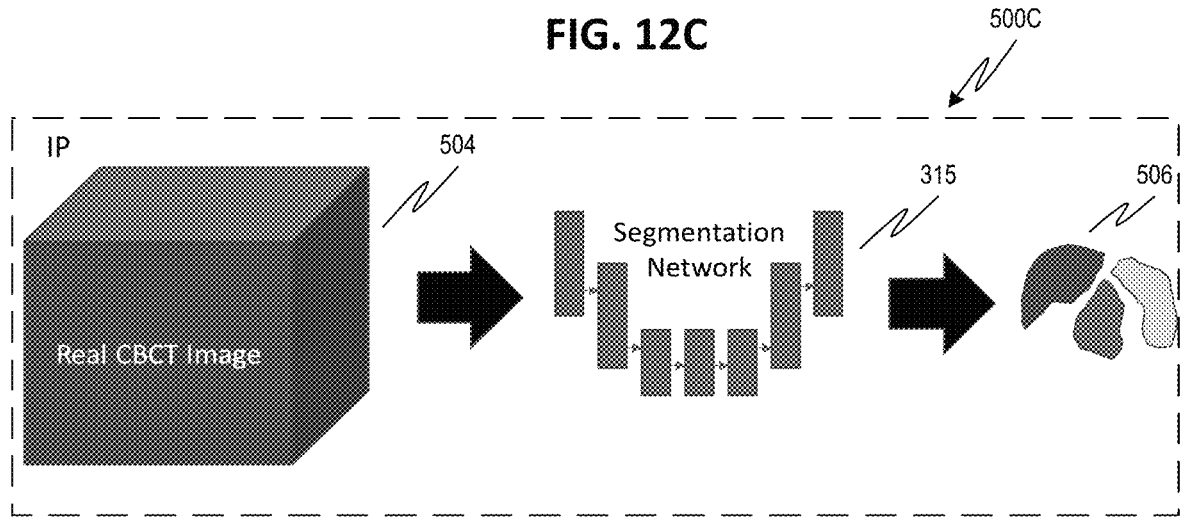

In some embodiments, as shown in FIGS. 11A and 11B, the original training data set 402 includes 3-D (CT) image(s) 404 and its corresponding 3-D ground truth label map 406 that associates an anatomical structure to each of the voxels of the 3-D image(s). In some embodiments, the 3-D image(s) 404 may be divided into a sequential stack of adjacent 2-D images 404, and the 3-D ground truth label map can include sequential 2-D ground truth label maps, respectively corresponding to the sequential stack of adjacent 2-D images. The original training data set 402 can have images that have already been segmented (i.e., contoured), where a ground truth label map provides a known anatomical structure label for each pixel of a representative image slice of the original training image. In other words, pixels of the ground truth label map can be associated with known anatomical structures.

The original training data set 402 is next processed in S504 using a pseudo-image generation approach 317, the specific steps thereof illustrated in detail in FIGS. 13-20, to produce a supplemental training data set 410 (pseudo training data set) with properties that provide realistic image and segmentation data for the target imaging modality. In embodiments, the target imaging modality can be different from the imaging modality of the original training data set 402.

The pseudo training data set 410 can include pseudo (synthetic) images (scans) 412 that are generated from the original training data set 402. The generated pseudo images 412 provide a realistic model of the interaction of image generating signals (X-rays, for example) with the patient 110, while also providing a realistic patient model (i.e., accurate contours of the anatomical structures, and/or accurate features relating to a condition of an anatomical structure). The generated pseudo images 412 also contain the same ground truth contours 406 as the original training images 404, while depicted as if contained in images of the target imaging modality.

In exemplary embodiments, the generated pseudo images 412 include images of a second imaging modality, with the second imaging modality being different from the first imaging modality of the training data set 402.

In exemplary embodiments, the generated pseudo images 412 include images of a target imaging modality, with the target imaging modality being different from the first imaging modality of the training data set 402.

In the exemplary embodiment of FIGS. 11A and 11B, the pseudo training data set 410 includes 3-D (CBCT) image(s) 412 and its corresponding 3-D ground truth label map 406 that associates an anatomical structure to each of the voxels of the 3-D image(s). In some embodiments, the 3-D image(s) 412 may be divided into a sequential stack of adjacent 2-D images 412, and the 3-D ground truth label map 406 can include sequential 2-D ground truth label maps, respectively corresponding to the sequential stack of adjacent 2-D images. The pseudo training data set 410 can therefore have pseudo images 412 where a ground truth label map 406 provides a known anatomical structure label for each pixel of a representative image slice of the original training image 404. In other words, pixels of the ground truth label map can be associated with known anatomical structures.

Optionally, the pseudo training data set 410 can be further processed as shown in FIGS. 10C and 10D to combine any two or more pseudo images 412 from the pseudo training data set 410 using any suitable augmentation/combination approach 360 to generate a second pseudo training data set 410' including the combined pseudo images 412' with modified properties that may improve the segmentation DNN model 315 generalization.

Optionally, each of the original training data set 402, and the first and second pseudo training data sets 410, 410' can be further pre-processed using any suitable data augmentation approach (e.g., rotation, flipping, translation, scaling, noise addition, cropping, or combinations thereof) to produce additional training data sets with modified properties that may further improve model generalization.

Optionally, the original training data set 402 and the first and second pseudo training data sets 410, 410' can include additional subsets. For example, data sets 402, 410 and 410' can each include a validation set that is used to track the quality of the segmentation DNN model 315 during training thereof, but is not otherwise used as input to the model 315 during training.

Alternatively or additionally, the original training data set 402, and the first and second pseudo training data sets 410, 410' can each include a test subset that is only used after training to quantify the quality of the trained model 315 (e.g., accuracy, dice score) and/or to verify that the model 315 has not over-learned or under-learned the data.

In training phase 400, the process S500 can proceed to S506, where training of the segmentation DNN model 315 occurs. The segmentation DNN model 315 can be trained to output contours 414 (414A-414D) for anatomical structures in the medical images 404. The training step S506 of the segmentation DNN model 315 is according to the process flow of FIG. 9, and can be represented by the layouts 400A-400D of FIGS. 10A-10D, and 11A-11B.

In particular, at S516, the training data (S516A and/or S516B and/or S516C) is provided as input data to the input layer of the segmentation DNN model 315. In the exemplary embodiment of FIG. 10A, the providing of the training data includes the providing at S516A of the training data from the original training data set 402 and the providing at S516B of the pseudo data from the first pseudo training data set 410. In the exemplary embodiment of FIG. 10B, the providing of the training data includes the providing at S516B of only the pseudo training data from the first pseudo training data set 410. In the exemplary embodiment of FIG. 10C, the providing of the training data includes the providing at S516A of the training data from the original training data set 402, the providing at S516B of the pseudo training data from the first pseudo training data set 410, and the providing at S516C of the pseudo training data from the second pseudo training data set 410'. In the exemplary embodiment of FIG. 10D, the providing of the training data includes the providing at S516B of the pseudo training data from the first pseudo training data set 410 and the providing at S516C of the pseudo data from the second pseudo training data set 410'.

At S526, the segmentation DNN model 315 processes the input data (i.e., input images) by propagating through nodes of its hidden layers. At S536, the segmentation DNN model 315 produces an output 420A-420D (e.g., contours of anatomical structures 414A-414D) at its respective output layer, which output 420A-420D (414A-414D) can be compared to ground truth contours 406 via a loss function 416 at S546. For example, loss function 416 can be mean-squared error, dice loss, cross entropy-based losses or any other loss function known in the art.

During the training S506, the segmentation DNN model 315 is given feedback 422A-422D (by loss function 416) on how well its output 420A-420D matches the correct output 421A-421D. The aim of training S506 is to train the segmentation DNN model 315 to perform automatic segmentation of anatomical structures in the image(s) by mapping input data (i.e., contours in the original and pseudo images) to example output data (i.e., ground truth contours 406). In some embodiments, training S506 can involve finding weights that minimize the training error (e.g., as determined by loss function 416) between ground truth contours 406 and estimated contours 414A-414D generated by the deep learning engine.

Once an iteration criteria is satisfied at S556 (e.g., loss function 416 meets a predetermined threshold, a threshold number of iterations has been reached, or no further improvement is seen between iterations), the segmentation DNN model 315 is fixed at S576. Otherwise, the training S506 proceeds to S566, where the model 315 is modified, e.g., by adjusting parameters of the hidden layer nodes, in order to improve the match between output 420A-420D and the desired output 421A-421D. The training process S506 thus can iterate repeatedly until the desired iteration criteria is satisfied at S556.

Alternatively or additionally, some parameters can be defined and adjusted at S566 in order to only impact training S506 of segmentation DNN model 315 without otherwise affecting inference, such as, but not limited to, loss function, hyper parameters (e.g., dropout, regularization), training data augmentation (e.g., to avoid overlearning and achieve better generalization), and preprocessing of input data (e.g., scaling, normalization).

In some embodiments, the providing of the training data set at S516 can include modifying the training data set to improve consistency thereof, for example, by processing the various medical images 404 of data set 402 or the pseudo images 412 of data set 410 or the pseudo images 412' of data set 410'. However, such processing may be time-intensive as it would require manual processing by the user, as well as re-training of the model 315 after each correction to see if the outputs 420A-420D are improved.

Once the training phase 400 has completed, the process S500 can proceed to the inference phase 500, which uses the trained DNN model 315 to process medical image(s) of a patient to automatically segment (i.e., contour) unknown anatomical structures shown therein. In inference phase 500, the image processing module can have a setup 500A-500C as illustrated in FIGS. 12A-12C. The process 500 can begin at S508, where a patient data set 502 including one or more medical image(s) 504 are provided to the trained segmentation DNN model 315. The image(s) of the patient can be obtained using any target medical imaging modality, such as, but not limited to, X-ray, computer tomography (CT), cone beam computed tomography (CBCT), spiral CT, positron emission tomography (PET), magnetic resonance imaging (MRI), functional MRI, single photon emission computed tomography (SPECT), optical tomography, ultrasound imaging, fluorescence imaging, radiotherapy portal imaging, or any combinations thereof. For example, image data may include a series of 2-D images or slices, each representing a cross-sectional view of the patient's anatomy. Alternatively or additionally, image data may include volumetric or 3-D images of the patient, or a time series of 2-D or 3-D images of the patient. The target imaging modality can be different from the first imaging modality of the original training data set 402. The target imaging modality can be the same as the imaging modality of the generated pseudo images 412 of the pseudo training data set 410 and/or the generated pseudo images 412' of the pseudo training data set 410'.

In an exemplary embodiment, as shown in FIG. 12C, the patient image data set 502 includes 3-D (CBCT) image(s) 504 including anatomical structures to be delineated. In some embodiments, the 3-D CBCT image(s) 504 may be divided into a sequential stack of adjacent 2-D images 502.

Process 500 can then proceed to S510, where the medical image(s) 504 are processed by the trained segmentation DNN model 315. The segmentation DNN model 315 thus outputs contour data 506 based on its training. In some embodiments, the contour data 506 may be combined with the original medical image(s) at S512, such that the contours 506 are overlaid on the corresponding anatomical structures in the image 504, for example, for visualization by a user or for use in radiation treatment planning. Alternatively, the segmentation DNN model 315 may directly produce the contours 506 on the medical images 504 as an output data set 508 without separate combination step S512.

Various modifications of the layouts and processes illustrated in FIGS. 10A-10D, 11A-11B, and 12A-12C are also possible according to one or more contemplated embodiments. For example, in some embodiments, the segmentation DNN model 315 may directly produce the contours on the medical images as an output, and the algorithm can directly modify the contours on the medical images, without necessarily requiring a separate combination step S512.

Alternatively or additionally, in some embodiments, non-imaging information can be used along with the medical image(s) of the patient in the inference phase. The non-imaging information can be provided to the trained segmentation DNN model 315 for use in generating the contour data 506.

Although a single segmentation DNN model 315 is illustrated in FIGS. 10A-10D, 11A-11B, and 12A-12C, and discussed with respect to FIGS. 8 and 9, embodiments of the disclosed subject matter are not limited thereto. For example, contours can be generated by employing one or more segmentation DNN models, working separately or in unison. For example, outputs from separate segmentation DNN models can be combined together to form a singular output of contour data. In such a configuration, each segmentation DNN model may have different operating characteristics, such as a different input image resolution, different hidden layer configuration, or different underlying neural network models (e.g., CNN versus RNN, etc.). Other variations and modifications will be readily apparent to one of ordinary skill in the art.

Turning to the process of augmenting the original training data set 402 to obtain the supplemental training data set 410, FIG. 13 illustrates exemplary processes that can be applied in S504 for generating the pseudo image(s) 412 of the pseudo training data set 410. As shown in FIG. 13, in S1000, the data augmentation engine 317 receives/obtains/accesses the original training data set 402 of medical images 404 including the contours 406 or anatomical features related to an anomaly/disease, etc. as ground truths. The data augmentation engine 317 is configured to apply a plurality of data augmentation processes, including applying different pseudo-image generating algorithms and process steps to generate pseudo images 412 of second imaging modality using the images 404 of the training data set 402 and the segmentation data (i.e., the contours) and/or anatomical features 406 contained therein. In exemplary embodiments, the user 351 can choose which pseudo-image generating process to apply. Alternatively, the data augmentation engine 317 may be configured to automatically determine and apply a suitable data augmentation process.

One of the options to generate the pseudo image(s) 412 of the pseudo training data set 410 is to apply a forward projection step coupled with a backward projection step as shown in steps S1001-S1004. Another option is to apply a forward projection step coupled with a neural network as shown in steps S1101-S1105. Another option is to apply a neural network as shown in steps S1111-S1114 to generate the pseudo images 412.

Figure 14:
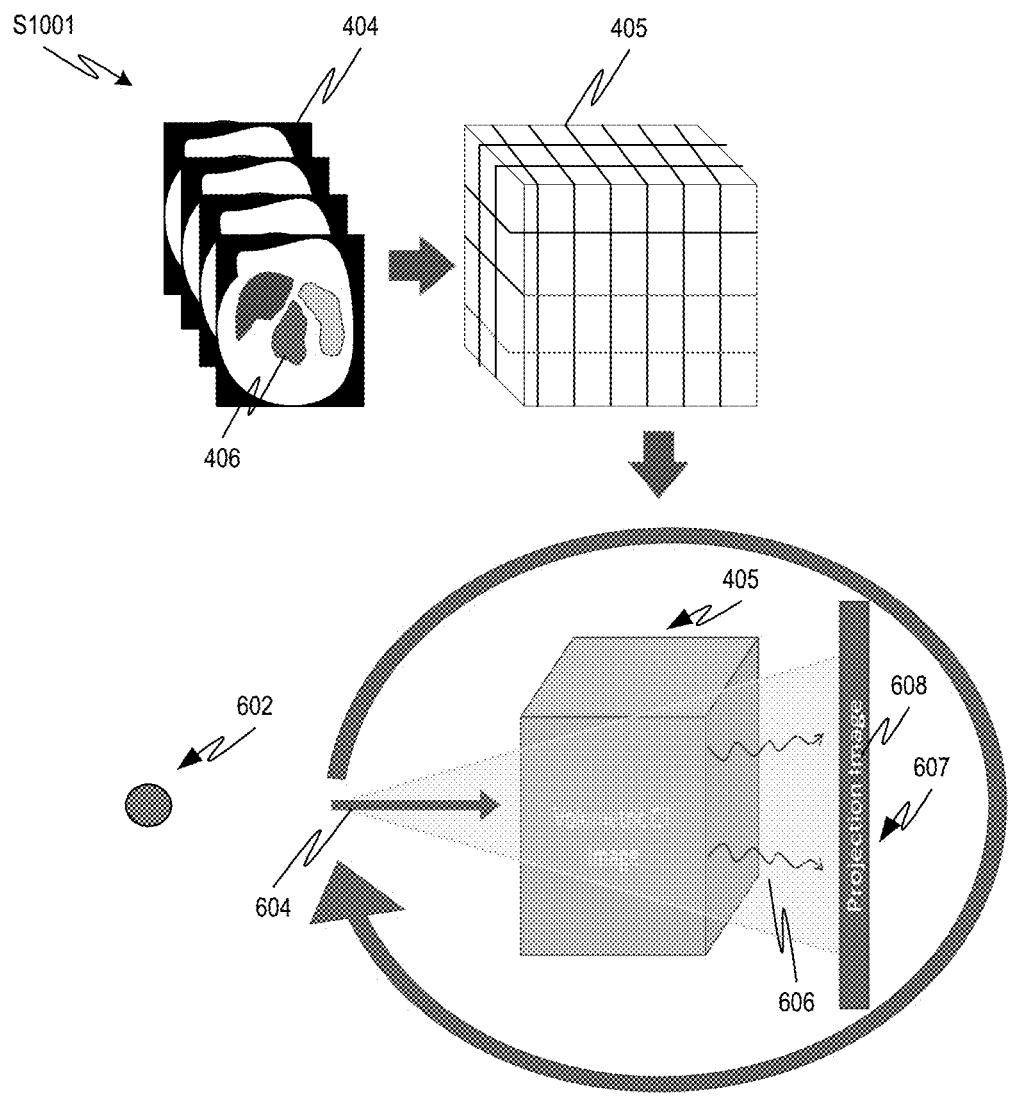
FIGS. 14-16 are simplified schematic diagrams of projection image generation, according to various embodiments of the disclosed subject matter.
Figure 15:
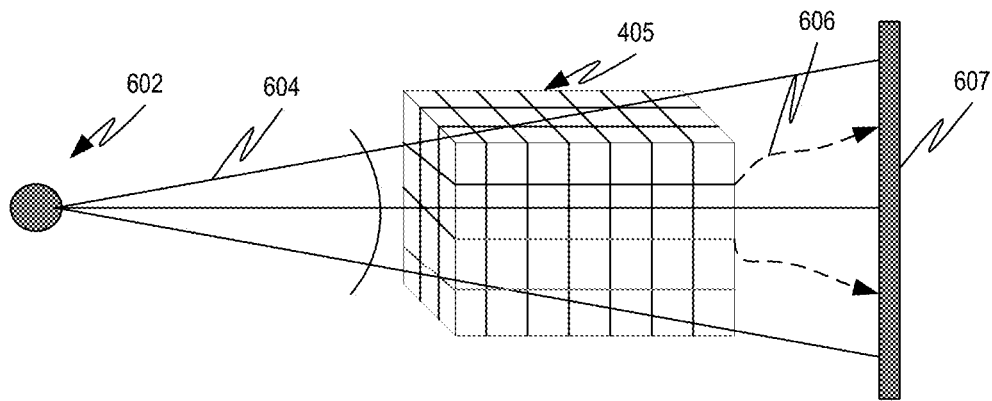
Figure 16:
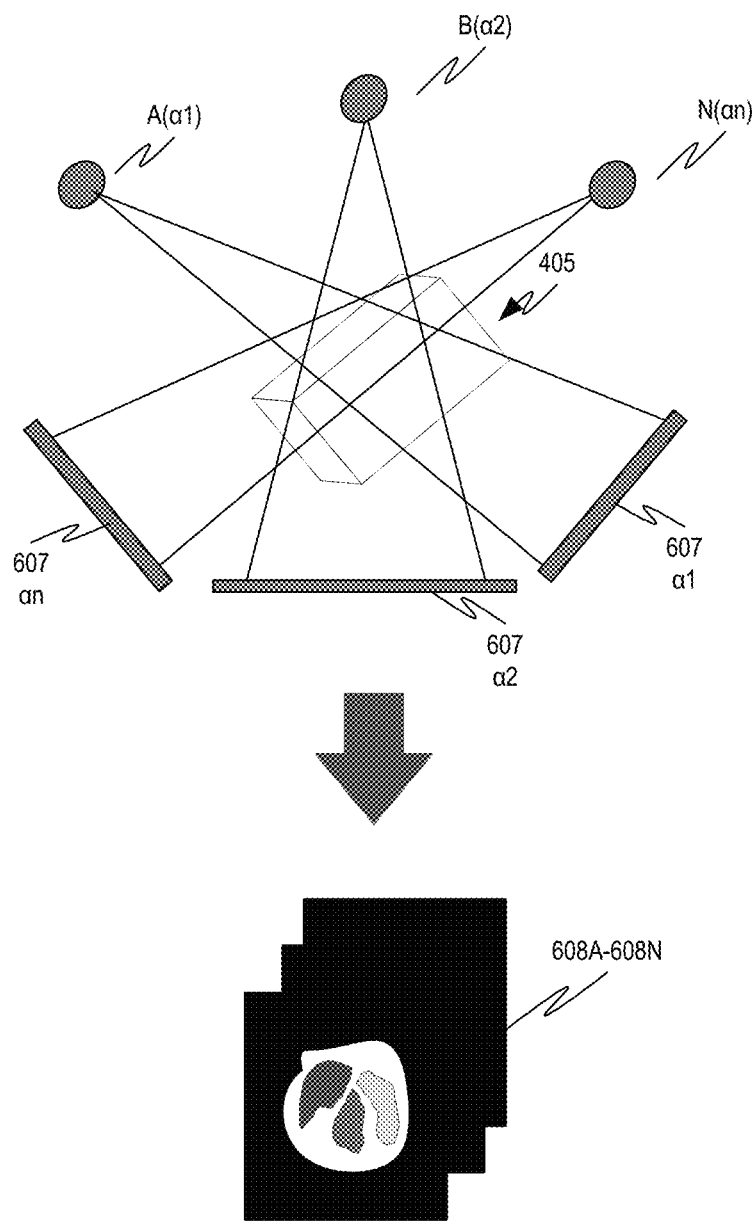

For the first option, at S1001, a forward projection algorithm is applied on the original training data set 402 to generate projection images (i.e., digitally reconstructed radiographs DRRs) 608 (608A-608N) from the original training images 404, as shown in FIGS. 14-16, for example.

To generate the projection images 608, a 3D array of voxels 405 (i.e., volume image data) from the set of training images 404 of the original training data set 402 is obtained. The 3D array of voxels 405 represents the original 3D images or the 2D image slices 404 viewed as a three-dimensional array. Then an algorithm can be applied to simulate a hypothetical radiation beam 604, such as, but not limited to, X-rays, from a virtual radiation source 602 centered on a point a distance away from the volume 405 centroid, passing through the volume 405 at different source positions (A-N) and corresponding projection angles (α1-αn), and captured on a plane of a virtual detector 607, as shown in FIGS. 14-15, also positioned at a distance away from the volume 405 centroid opposite the source 602. The line integrals over the Hounsfeld values across the rays through the voxel volume 405 construct each of the projection images 608A-608N in S1002, as shown in FIG. 16. The generated 2D projection images 608 (i.e., DRRs) represent projections of the anatomical structures and ground truths (contours and/or anatomical features) 406 of the 3D volume image 405.

Figure 17:
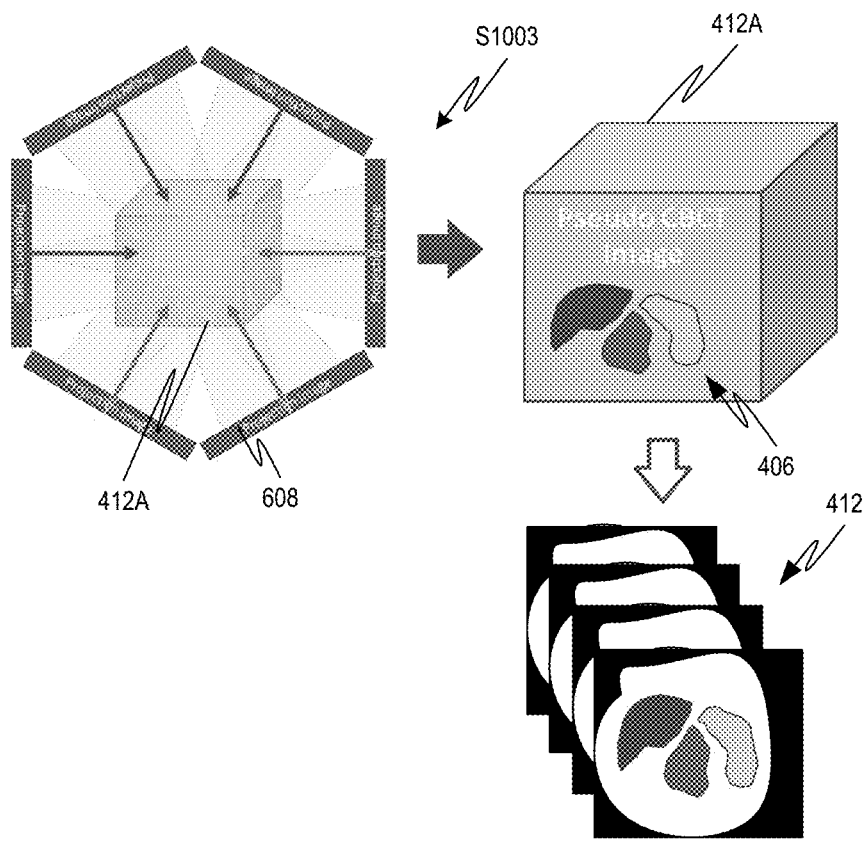
FIG. 17 is a simplified schematic diagram of pseudo image reconstruction from the projection images, according to various embodiments of the disclosed subject matter.

A back-projection algorithm is next applied in S1003 to accumulate (i.e., reconstruct) the generated projection images 608 onto a 3D volume 412A, taking into consideration the angles α from which the projection images 608 were acquired, as shown in FIG. 17. The reconstructed 3D volume 412A is a computer-generated image (i.e., a pseudo 3D volumetric image) representing a 3D image acquired in a target imaging modality, while based on actual image data acquired from images of the first imaging modality (i.e., original training images 404). The generated pseudo 3D volumetric image 412A contains the anatomical structures and ground truth contours and/or features 406 of the corresponding original training images 404.

The pseudo 3D volumetric image 412A obtained in S1003 can be further represented as a series of 2-D images or slices 412, each representing a cross-sectional view of the patient's anatomy, as shown in FIG. 17.

In order to generate a pseudo 3D volumetric image 412A (and/or 2D image scans of pseudo images 412) that provides a realistic model of the interaction of image generating signals (X-rays, for example) with the patient in the target imaging modality, while also providing a realistic patient model, the forward and backward projection algorithms applied to generate and reconstruct the projection images 608, accurately model the behavior of photons as they pass and scatter 606 through the volumetric images 405, accurately calculate the radiation dose on the virtual detector 607 pixels, and establish an accurate estimate of the actual imaging geometry corresponding to the generated projection images 608. In other words, the forward and backward projection algorithms accurately simulate the conditions present in the target imaging modality, and account for artifacts that are present in that imaging modality.

The algorithm applied in S1001 is a forward projection algorithm that takes into account the specific source and detector geometry used in the target imaging modality, the geometry of the radiation beam in the target imaging modality, as well as a plurality of particle-matter interactions, such as but not limited to scatter and penumbra, present in the target imaging modality, so as to accurately model the behavior of photons as they pass and scatter 606 through the volumetric images 405, accurately calculate the radiation dose, and establish an accurate estimate of the actual imaging geometry corresponding to the generated projection images 608.

In an exemplary embodiment, the forward projection algorithm can include one or more parameters for scatter correction, such as but not limited to, parameters to account for scatter through the patient holding device (i.e., patient couch), parameters to account for scatter through different material densities, parameters to account for scatter from elements of an imaging device used in generating images of the target imaging modality, parameters to account for artifacts introduced by movement of the source and/or the detector, and parameters to account for movement of the patient during imaging using the target imaging modality.

In exemplary embodiments, the forward projection algorithm further simulates artifacts that occur due to motion during the image acquisition. Motion may be simulated by deforming the 3D volume image 405 for each projection angle α before forward projection.

Alternatively, the forward projection algorithm may simulate artifacts due to motion during the image acquisition by overlaying a moving object on the 3D volume image 405 for each projection angle α before forward projection.

Additionally, the forward projection algorithm may further include additional parameters to correct for artifacts introduced by image lag, detector scatter, body scatter and beam hardening, for example.

In exemplary embodiments, the forward projection algorithm is further configured to generate primary projection images and scatter images, the scatter images representing the portion of the projection image 608 generated by the scattered rays 606.

In exemplary embodiments, the forward projection algorithm is further configured to remove the scatter images from the primary projection images.

In exemplary embodiments, the projection images obtained in S1002 can be the projection images 608 from which scatter images have been removed.

The back-projection algorithm also takes into account one or more of the source and detector geometry and the geometry of the radiation beam in the target imaging modality.

In exemplary embodiments, the back-projection algorithm can be an iterative reconstruction algorithm that includes parameters to correct for artifacts introduced by image lag, detector scatter, body scatter and beam hardening, for example.

In exemplary embodiments, the back-projection algorithm can further include parameters that correct for noise and artifacts introduced by patient motion, for example.

Figure 18:
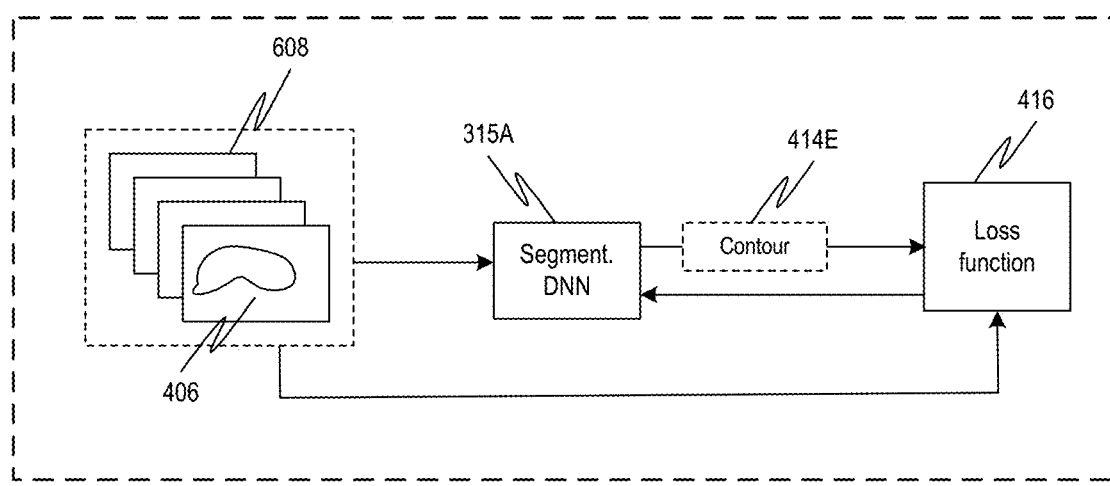
FIG. 18 is a simplified schematic diagram of a neural network model training based on projection image data, according to various embodiments of the disclosed subject matter.

As an alternative option, pseudo images 412 may be generated by applying a forward projection algorithm at S1101 on the images 404 of the original training data set 402 to obtain projection image data at S1102, and instead of using a back-projection step to reconstruct the pseudo 3D image, the projection image data obtained in S1102 can be used as input for training a segmentation DNN model 315A to generate an output, such as contours 414E for the anatomical structures in the projection images 608, as shown in FIG. 18, for example. The forward projection algorithm can be the same as the forward projection algorithm used in the first option. Namely, the forward projection algorithm is such that it accounts for the artifacts of the target imaging modality.

Figure 2A:
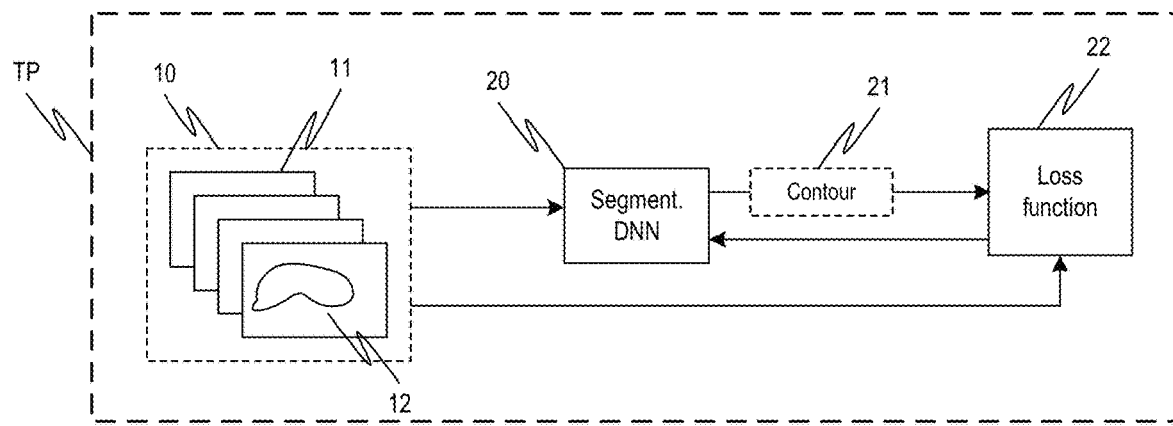
FIG. 2A is a simplified schematic diagram of operation of a neural network model during a training phase, according to various embodiments of the disclosed subject matter.
Figure 2B:
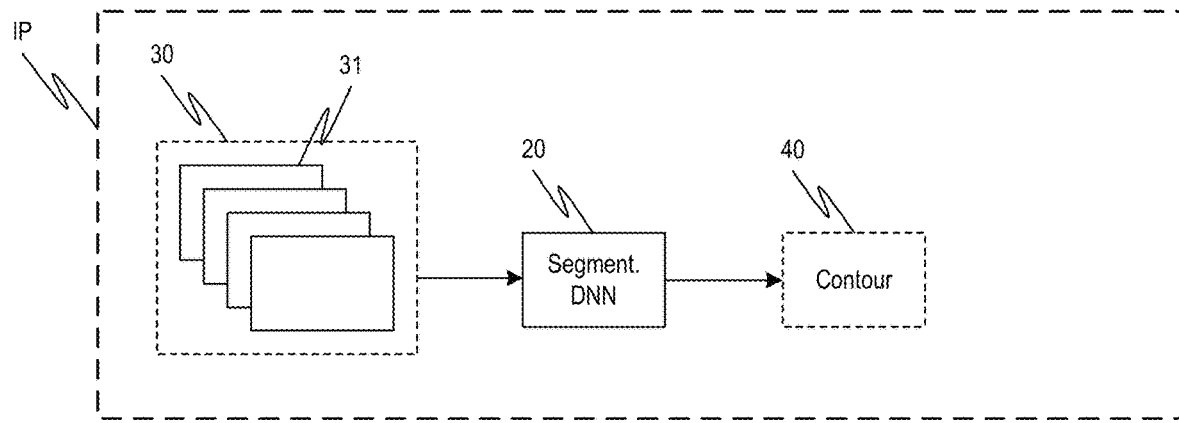
FIGS. 2B-2C is a simplified schematic diagram of operation of a neural network model during an inference phase, according to various embodiments of the disclosed subject matter.
Figure 2C:
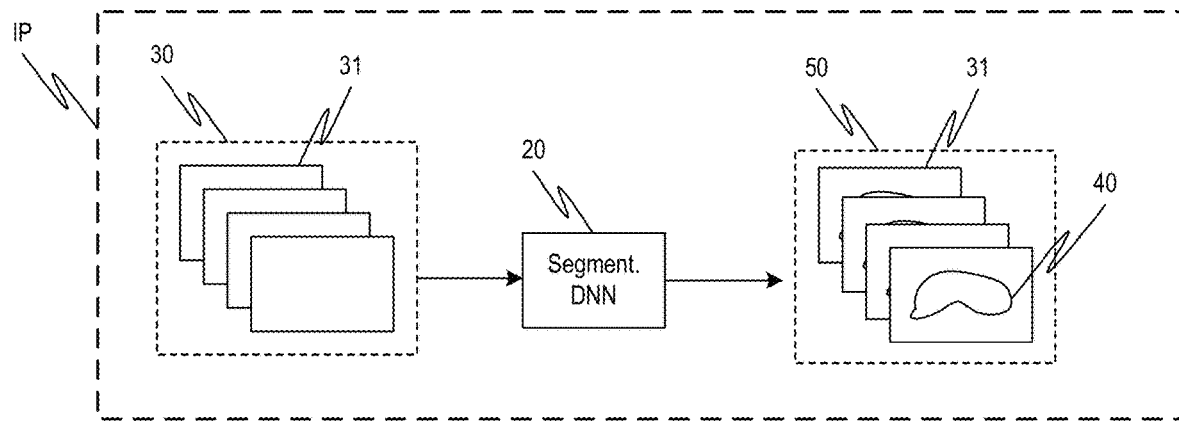
Figure 2D:
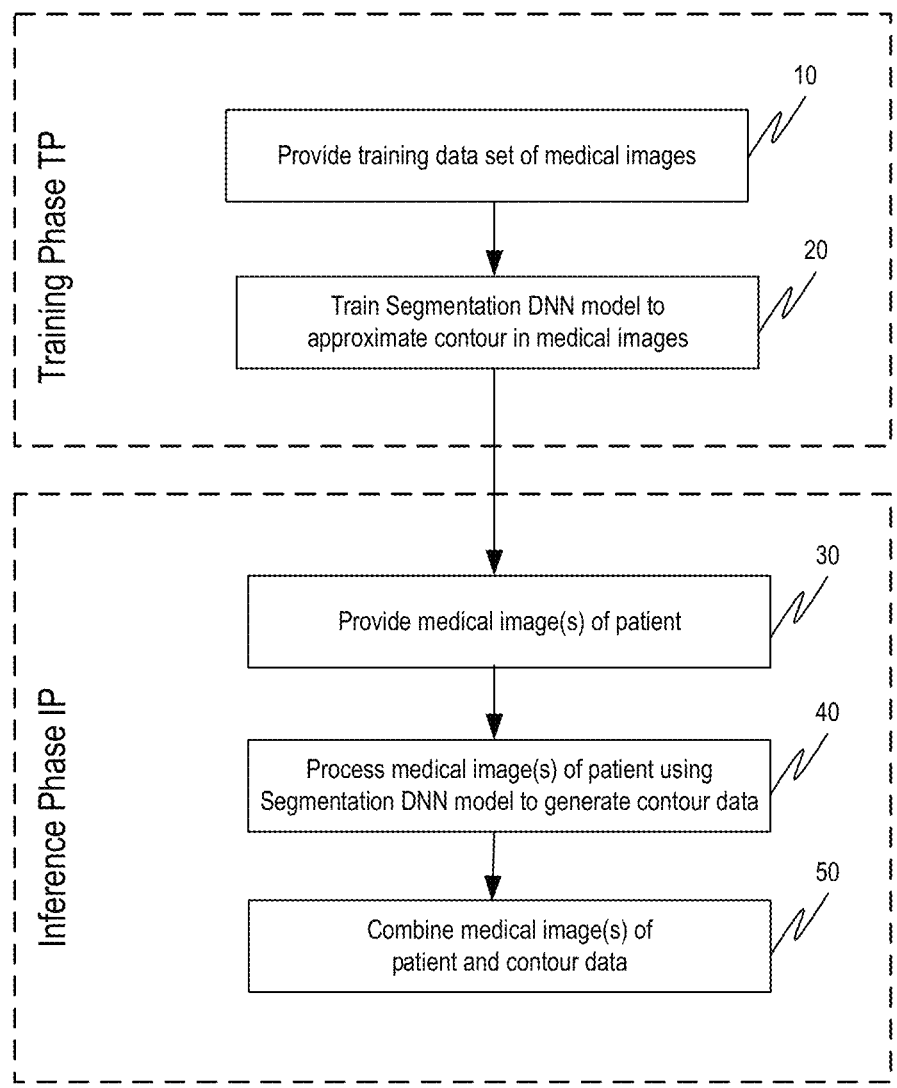
FIG. 2D is a process flow diagram for generalized training and inference phases of a neural network model, according to various embodiments of the disclosed subject matter.

The steps taken in the training of the segmentation DNN model 315A could also follow the general model training steps as shown in FIGS. 2D, 3 and 4. For example, for the training of the segmentation DNN model 315A, the projection data, including the projection images 608 obtained using a forward projection algorithm, and the ground truth contours 406 contained therein, is provided as input data to the input layer of the segmentation DNN model 315A. The segmentation DNN model 315A processes the projection images 608 by propagating through nodes of its hidden layers. The segmentation DNN model 315A produces an output 414E (e.g., contours of anatomical structures) at its respective output layer, which output 414E can be compared to ground truth contours 406 via a loss function 416. For example, loss function 416 can be mean-squared error, dice loss, cross entropy-based losses or any other loss function known in the art.

During the training, the segmentation DNN model 315A is given feedback on how well its output 414E matches the correct output 406. The aim of training is to train the segmentation DNN model 315A to perform automatic segmentation of anatomical structures in the projection image(s) 608 by mapping input data to example output data (i.e., ground truth contours 406). In some embodiments, training can involve finding weights that minimize the training error (e.g., as determined by loss function 416) between ground truth contours 406 and estimated contours 414E generated by deep learning engine.

Once an iteration criteria is satisfied (e.g., loss function 416 meets a predetermined threshold, a threshold number of iterations has been reached, or no further improvement is seen between iterations), the segmentation DNN model 315A is fixed. Otherwise, the training continues by modifying the model 315A, e.g., by adjusting parameters of the hidden layer nodes, in order to improve the match between output 414E and the desired output 406. The training process thus can iterate repeatedly until the desired iteration criteria is satisfied.

The so trained segmentation DNN model 315A can then be applied in S1104 on the images 404 of the original training data set 402 to obtain contour data, which, when combined with the images 404 of the original training data set 402 in S1105, gives as output, pseudo 2D images of target imaging modality.

Figure 19:
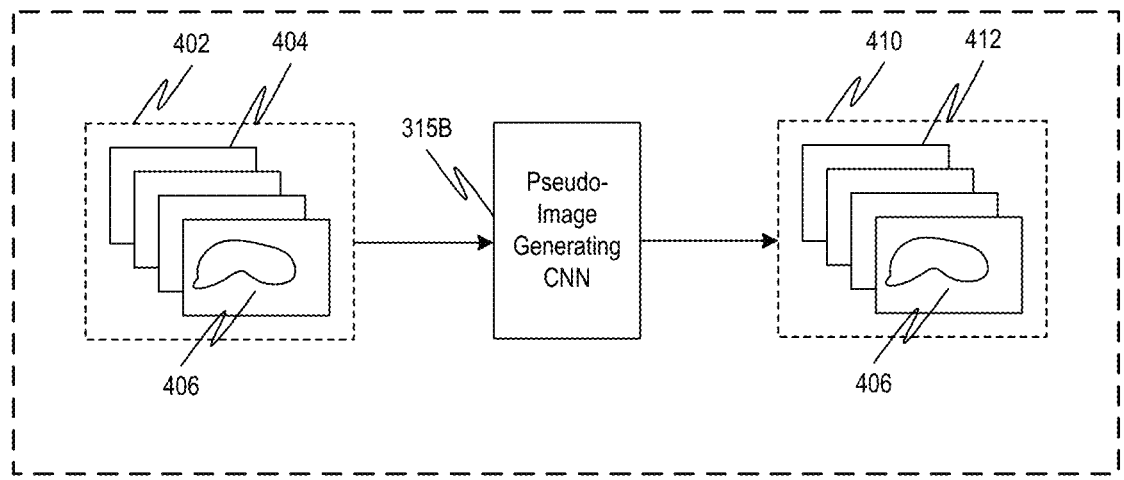
FIG. 19 is a simplified schematic diagram of the trained neural network model during an inference phase, according to various embodiments of the disclosed subject matter.
Figure 20:
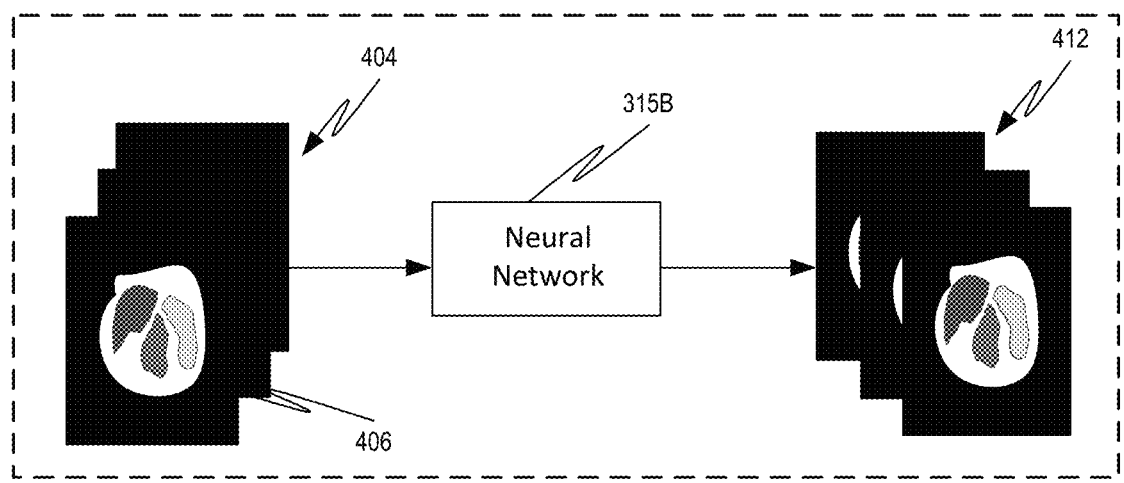
FIG. 20 is a simplified schematic diagram of operation of a trained neural network model to generate pseudo images, according to various embodiments of the disclosed subject matter.

As another alternative option, the pseudo images 412 can be generated as shown in process steps S1111-S1114. In S1111, a trained neural network model 315B is applied on the images 404 of the original training data set 402. The trained network model 315B can be a convolutional neural network (CNN) model stored in the storage database of memory 312 or the external model storage database 500, for example, that is trained to automatically generate a pseudo image(s) of a second imaging modality from images of a first imaging modality. When applied on the images 404 of the original training data set 402 of the first imaging modality, the trained CNN model 315B generates, as output, pseudo image data of the second imaging modality in S1112, as shown in FIGS. 19 and 20. The obtained pseudo image data of the second imaging modality combined with medical images of the first imaging modality 404 in S1113, outputs a set of pseudo images 412 of second imaging modality that include the ground truth contours 406 of the original training data set 402.

Figure 21A:
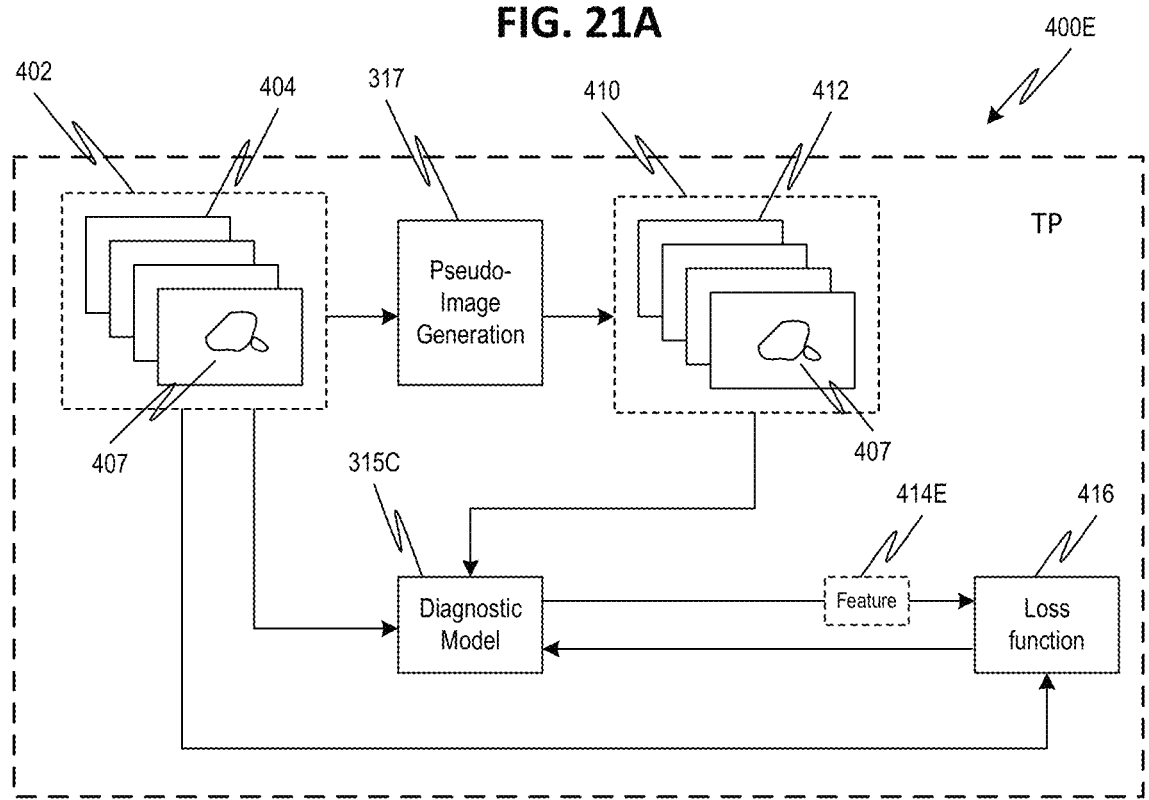
FIGS. 21A-21B are simplified schematic diagrams of operation of a diagnostic model during a training phase, according to various embodiments of the disclosed subject matter.
Figure 21B:
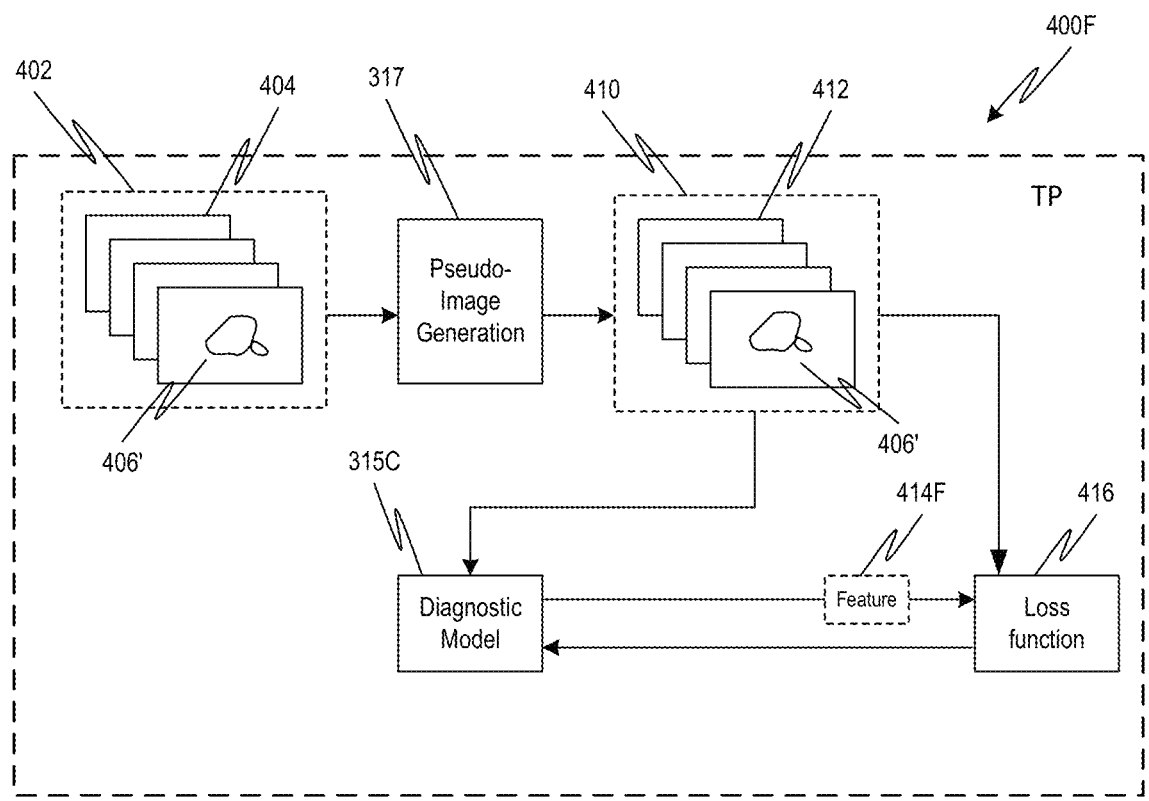
Figure 22:
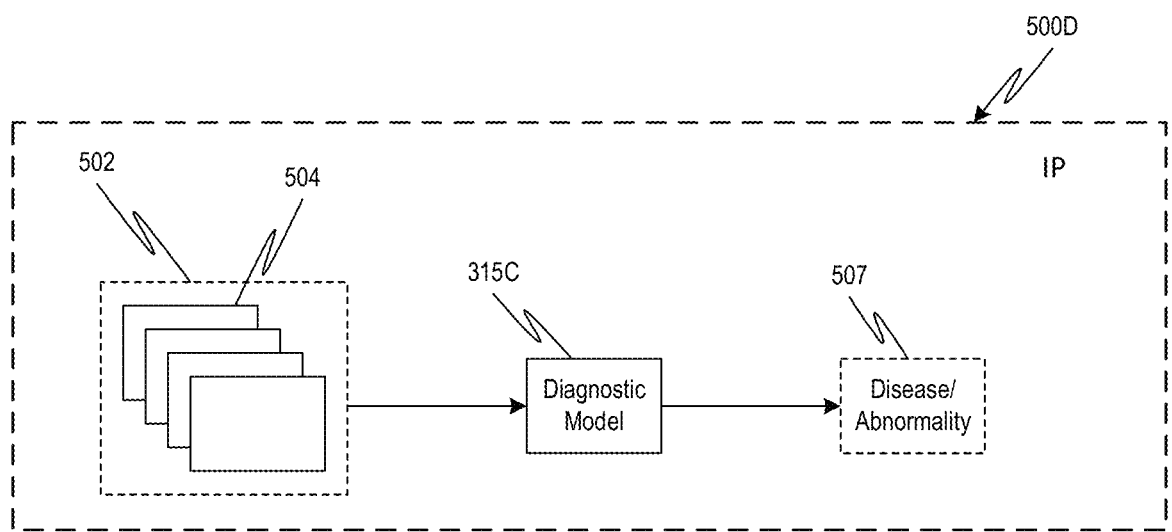
FIG. 22 is a simplified schematic diagram of operation of a diagnostic model during a training phase, according to various embodiments of the disclosed subject matter.

Although the processes illustrated in FIGS. 8-20 are specific to the training and inference phases of a segmentation DNN model, embodiments of the disclosed subject matter are not limited thereto. For example, instead of a segmentation DNN model 315, a diagnostic model 315C can be trained (400E, 400F) using an augmented data set to recognize an anatomic anomaly and/or condition in the training data set 402, and associate the anomaly/condition with a particular disease, such as, but not limited to a collapsed lung, for example, as shown in FIGS. 21A-21B and 22. In such a scenario, the original training data set 402 does not include contours as ground truths, and the pseudo images 412 may not include the contours from the original training images. Instead, the original images 404 of the training data set 402 may include one or more anatomical features 407 associated with a particular disease as ground truth, and the generated pseudo images 412 include these features. The diagnostic model is trained to detect (414E, 414F) these features in medical images (FIGS. 21A-21B), so as to recognize the presence of a particular condition 507 related to disease, for example, in medical images 504 of a patient during inference 500D (FIG. 22).

It will therefore be appreciated that methods are described wherein a training data set is augmented with pseudo images that accurately reflect the ground truths in imaging modalities of the patient images in the inference phase.

It will also be appreciated that methods are described to train a segmentation model to approximate contours in patient images that are difficult to otherwise segment.

It will also be appreciated that methods are described to train a diagnostic model to detect features in medical images that are associated with a particular disease and/or anatomical anomaly/abnormality.

It will also be appreciated that methods are described comprising: training a neural network model using a first data set of medical images and a second data set of medical images, the medical images of the first data set including medical images of a first imaging modality, each of the medical images of the first data set including a contour of an anatomical structure therein, the medical images of the second data set including pseudo medical images of a second imaging modality, the pseudo medical images of the second data set being generated from corresponding medical images of the first data set, each of the pseudo medical images of the second data set including therein the contour of the anatomical structure contained in a corresponding medical image of the first data set, and training the neural network model using at least the medical images of the second data set and the copied contours therein to approximate the contour of the anatomical structure.

It will also be appreciated that methods are described comprising: augmenting a first data set of medical images with a second data set of medical images, the medical images of the first data set being of a first imaging modality and the medical images of the second data set being pseudo medical images of a second imaging modality, and training a machine learning model using at least the pseudo medical images of the second data set and features included therein, wherein the pseudo images of the second data set are generated from corresponding medical images of the first data set, and wherein the features in the pseudo images are features that are included in corresponding medical images of the first data set.

The machine learning model can be a segmentation model, and each of the medical images of the first data set can include a contour of the anatomical structure therein, each of the pseudo medical images of the second data set can include the contour of the anatomical structure contained in corresponding medical images of the first data set, and the training of the segmentation neural network model includes using at least the pseudo medical images of the second data set and the contours contained therein.

Alternatively, or additionally, the machine learning model can be a diagnostic model, each of the medical images of the first data set can include a feature of an anatomical condition therein, each of the pseudo medical images of the second data set can include the feature of the anatomical condition contained in corresponding medical images of the first data set, and the training of the diagnostic model includes using at least the pseudo medical images of the second data set and the features of the anatomical condition contained therein.

It will also be appreciated that systems are described comprising: one or more data storage devices storing at least one machine learning model, the machine learning model having been trained to approximate a contour of an anatomical structure or to predict an anatomical condition, and one or more processors operatively coupled to the one or more data storage devices and configured to employ the at least one machine learning model to process one or more medical images of a target imaging modality of a patient to generate one or more contours of anatomical structures in the medical images of the patient or to predict an anatomical condition from the medical images of the patient, wherein the one or more processors are further configured to train the machine learning model using a first data set of medical images and a second data set of medical images, the medical images of the first data set including medical images of a first imaging modality, and the medical images of the second data set including pseudo medical images of the target imaging modality, the one or more processors being further configured to generate the pseudo medical images of the second data set from corresponding medical images of the first data set.

It will also be appreciated that systems are described, comprising: one or more data storage devices storing at least one neural network model, the neural network model having been trained to approximate a contour of an anatomical structure, and one or more processors operatively coupled to the one or more data storage devices and configured to employ the at least one neural network model to process one or more medical images of a target imaging modality of a patient to generate one or more contours of anatomical structures in the medical images of the patient, wherein the one or more processors are further configured to train the neural network model to approximate contours of anatomical structures using a first data set of medical images and a second data set of medical images, the medical images of the first data set including medical images of a first imaging modality, and the medical images of the second data set including pseudo medical images of the target imaging modality, the one or more processors being further configured to generate the pseudo medical images of the second data set from corresponding medical images of the first data set.

Each of the medical images of the first data set can include a contour of an anatomical structure therein, and the one or more processors are configured to replicate the contours of the medical images of the first data set in corresponding pseudo images of the second data set.

The one or more processors can be further configured to generate the pseudo images of the second imaging modality using one of a forward projection technique, a forward projection coupled with a backward projection technique, and a trained neural network technique.

The forward projection technique can include generating projection images from the medical images of the first data set.

The generating of the projection images can include simulating radiation passing through the volumetric image, wherein the simulating can include determining radiation attenuation based on a plurality of first parameters including radiation beam geometry, radiation source geometry, radiation detector geometry, and radiation interaction with matter.

The generating of the projection images can include generating a volumetric image from 2D training image slices and simulating radiation passing through the volumetric image, wherein the simulating can include determining radiation attenuation based on a plurality of first parameters including radiation beam geometry, radiation source geometry, radiation detector geometry, and radiation interaction with matter.

The generating of the projection images can further include determining radiation dose distributed through the volumetric image data and generating pseudo-dose distribution matrices based on the calculated radiation dose matrices. The generated pseudo-dose distribution matrices can also be used as input data to train a deep neural network.

The forward projecting step can further include simulating reconstruction artifacts related to the second imaging modality.

The reconstruction artifacts can include artifacts related to motion occurring during imaging using the second imaging modality.

The simulating can include deforming the volumetric image before the generating of projection images and/or overlaying a moving object on the volumetric image.

The forward and backward projection technique can include reconstructing the projection images into a pseudo volumetric image of the medical images of the second data set, wherein the reconstructing of the projection images can include accumulating the projection images onto a pseudo 3D volume, and generating 2D pseudo medical images of the second data set from the pseudo volumetric image.

The accumulating may be based on a plurality of second parameters including radiation source geometry and radiation detector geometry.

The generating of the pseudo images of the second data set can be done using a neural network trained to predict a pseudo image of a second imaging modality based on an image of a first imaging modality.

In embodiments, the system can further comprise a radiotherapy device configured to deliver radiation treatment to a patient, wherein the one or more processors are further configured to control the radiotherapy device to irradiate the patient according to a treatment plan based at least on the one or more medical images of the patient and the generated contours.

The one or more processors are configured to train the neural network model by an iterative process and calculate a loss function after each iteration; and receive input to modify the loss function prior to or during the iterative process to change the contour of the anatomical structure.

It will also be appreciated that a non-transitory computer-readable storage medium upon which is embodied a sequence of programmed instructions is also described, and a computer processing system that executes the sequence of programmed instructions embodied on the computer-readable storage medium to cause the computer processing system to train a neural network model to approximate contours of anatomical structures using a first data set of medical images and a second data set of medical images, the medical images of the first data set including medical images of a first imaging modality, and the medical images of the second data set including pseudo medical images of a second imaging modality, generate the pseudo medical images of the second data set from corresponding medical images of the first data set, and process one or more medical images of a patient using the trained neural network model to generate one or more contours of anatomical structures in the medical images of the patient.

It will be further appreciated that a non-transitory computer-readable storage medium upon which is embodied a sequence of programmed instructions is also described, and a computer processing system that executes the sequence of programmed instructions embodied on the computer-readable storage medium to cause the computer processing system to train a machine learning model using a first data set of medical images and a second data set of medical images, the medical images of the first data set including medical images of a first imaging modality, and the medical images of the second data set including pseudo medical images of a second imaging modality, generate the pseudo medical images of the second data set from corresponding medical images of the first data set, and process one or more medical images of a patient using the trained machine learning model, wherein the execution of the sequence of programmed instructions further causes the computer processing system to generate the pseudo images of the second imaging modality using one of a forward projection technique, a forward projection coupled with a backward projection technique, wherein the forward projection technique includes generating projection images from the medical images of the first data set by simulating radiation passing through volumetric images of the first data set, and wherein the backward projection technique includes reconstructing the projection images into a pseudo volumetric image of the medical images of the second data set, wherein the reconstructing of the projection images includes accumulating the projection images onto a pseudo 3D volume, the forward projecting step further including simulating acquisition inaccuracies related to the second imaging modality, the acquisition inaccuracies including inaccuracies related to motion occurring during imaging using the second imaging modality, wherein the accumulating is based on a plurality of second parameters including radiation source geometry and radiation detector geometry, and wherein the simulating includes determining radiation attenuation based on a plurality of first parameters including radiation beam geometry, radiation source geometry, radiation detector geometry, and radiation interaction with matter.

It will be appreciated that the aspects of the disclosed subject matter can be implemented, fully or partially, in hardware, hardware programmed by software, software instruction stored on a computer readable medium (e.g., a non-transitory computer readable medium), or any combination of the above. For example, components of the disclosed subject matter, including components such as a controller, module, model, neural network, or any other feature, can include, but are not limited to, a personal computer or workstation or other such computing system that includes a processor (e.g., graphics processing unit), microprocessor, microcontroller device, or is comprised of control logic including integrated circuits such as, for example, an application specific integrated circuit (ASIC). Features discussed herein can be performed on a single or distributed processor (single and/or multi-core), by components distributed across multiple computers or systems, or by components co-located in a single processor or system. For example, aspects of the disclosed subject matter can be implemented via a programmed general purpose computer, an integrated circuit device (e.g., ASIC), a digital signal processor (DSP), an electronic device programmed with microcode (e.g., a microprocessor or microcontroller), a hard-wired electronic or logic circuit, a programmable logic circuit (e.g., programmable logic device (PLD), programmable logic array (PLA), field-programmable gate array (FPGA), programmable array logic (PAL)), software stored on a computer-readable medium or signal, an optical computing device, a networked system of electronic and/or optical devices, a special purpose computing device, a semiconductor chip, a software module or object stored on a computer-readable medium or signal.

When implemented in software, functions may be stored on or transmitted over as one or more instructions or code on a computer-readable medium. The steps of any process, method, or algorithm disclosed herein may be embodied in a processor-executable software module, which may reside on a computer-readable medium. Instructions can be compiled from source code instructions provided in accordance with a programming language. The sequence of programmed instructions and data associated therewith can be stored in a computer-readable medium (e.g., a non-transitory computer readable medium), such as a computer memory or storage device, which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

As used herein, computer-readable media includes both computer storage media and communication media, including any medium that facilitates transfer of a computer program from one place to another. Thus, a storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a transmission medium (e.g., coaxial cable, fiber optic cable, twisted pair, digital subscriber line (DSL), or wireless technologies such as infrared, radio, and microwave), then the transmission medium is included in the definition of computer-readable medium. Moreover, the operations of any process, method, or algorithm disclosed herein may reside as one of (or any combination of) or a set of codes and/or instructions on a machine readable medium and/or computer-readable medium, which may be incorporated into a computer program product.

One of ordinary skill in the art will readily appreciate that the above description is not exhaustive, and that aspects of the disclosed subject matter may be implemented other than as specifically disclosed above. Indeed, embodiments of the disclosed subject matter can be implemented in hardware and/or software using any known or later developed systems, structures, devices, and/or software by those of ordinary skill in the applicable art from the functional description provided herein.

In this application, unless specifically stated otherwise, the use of the singular includes the plural, and the separate use of "or" and "and" includes the other, i.e., "and/or." Furthermore, use of the terms "including" or "having," as well as other forms such as "includes," "included," "has," or "had," are intended to have the same effect as "comprising" and thus should not be understood as limiting.

Any range described herein will be understood to include the endpoints and all values between the endpoints. Whenever "substantially," "approximately," "essentially," "near," or similar language is used in combination with a specific value, variations up to and including 10% of that value are intended, unless explicitly stated otherwise.

Many alternatives, modifications, and variations are enabled by the present disclosure. While specific examples have been shown and described in detail to illustrate the application of the principles of the present invention, it will be understood that the invention may be embodied otherwise without departing from such principles. For example, disclosed features may be combined, rearranged, omitted, etc. to produce additional embodiments, while certain disclosed features may sometimes be used to advantage without a corresponding use of other features. Accordingly, Applicant intends to embrace all such alternative, modifications, equivalents, and variations that are within the spirit and scope of the present invention.

The invention claimed is:

1. A method comprising:
generating a second data set of medical images from corresponding medical images of a first data set, the medical images of the first data set being medical images of a first imaging modality and including features of anatomical structures or anatomical conditions therein, and the medical images of the second data set being pseudo medical images of a second imaging modality and including same features therein as those included in corresponding medical images of the first data set, the first imaging modality being different from the second imaging modality; and
training a machine learning model using, as input data, the training medical images of the first data set and the features included therein and the pseudo medical images of the second data set and the features included therein,
wherein the generating of the pseudo images includes a forward projection step coupled with a backward projection step, a forward projection step coupled with a trained neural network step, or a trained neural network step,
wherein the forward projection step includes generating projection images from the medical images of the first data set,
wherein the backward projection step includes reconstructing the projection images into a pseudo volumetric image of the medical images of the second data set, the reconstructing of the projection images including accumulating the projection images onto a pseudo 3D volume, and wherein the accumulating is based on a plurality of second parameters including radiation source geometry and radiation detector geometry, and
wherein the trained neural network step includes using a neural network trained to predict a pseudo image of the second imaging modality based on an image of the first imaging modality.

2. The method of claim 1, wherein the machine learning model is a segmentation model,
each of the medical images of the first data set includes a contour of the anatomical structure therein,
each of the pseudo medical images of the second data set includes the contour of the anatomical structure contained in corresponding medical images of the first data set, and
the training of the segmentation model includes using the pseudo medical images of the second data set and the contours contained therein, and the medical images of the first data set and the contours contained therein.

3. The method of claim 2, wherein the contour of the anatomical structure in the first data set is custom defined by a user.

4. The method of claim 1, wherein the machine learning model is a diagnostic model,
each of the medical images of the first data set includes a feature of an anatomical condition therein,
each of the pseudo medical images of the second data set includes the feature of the anatomical condition contained in corresponding medical images of the first data set, and
the training of the diagnostic model includes using the pseudo medical images of the second data set and the features of the anatomical condition contained therein and the medical images of the first data set and the features of the anatomical condition contained therein.

5. The method of claim 1, wherein the first imaging modality and the second imaging modality are selected from the group of CT, CBCT, PET, SPECT, ultrasound, and MRI.

6. The method of claim 1, wherein the first data set includes a volumetric image set and the generating of the projection images includes simulating radiation passing through the volumetric image set.

7. The method of claim 6, wherein the simulating includes determining radiation attenuation.

8. The method of claim 7, wherein the determining radiation attenuation is based on a plurality of first parameters including radiation beam geometry, radiation source geometry, radiation detector geometry, and radiation interaction with matter.

9. The method of claim 1, wherein the forward projection step further includes simulating acquisition inaccuracies related to the second imaging modality.

10. The method of claim 9, wherein the acquisition inaccuracies relate to motion occurring during imaging using the second imaging modality.

11. The method of claim 10, wherein the simulating includes deforming the volumetric images before the generating of projection images or overlaying a moving object on the volumetric images.

12. The method of claim 1, further comprising generating 2D pseudo medical images of the second data set from the pseudo volumetric image.

13. The method of claim 1, further comprising:
processing a third data set of medical images using the trained machine learning model to generate one or more contours of anatomical structures in the medical images of the third data set or to predict an anatomical condition from the medical images of the third data set,
wherein the medical images of the third data set are of the second imaging modality,
the method further comprising developing a treatment plan for radiotherapy based at least on the third data set of medical images and the generated contours.

14. A system comprising:
one or more data storage devices storing at least one machine learning model, the machine learning model having been trained to approximate a contour of an anatomical structure or to predict an anatomical condition; and
one or more processors operatively coupled to the one or more data storage devices and configured to:
employ the at least one trained machine learning model to process a third data set of medical images of a target imaging modality of a patient to generate one or more contours of anatomical structures in the medical images of the patient or to predict an anatomical condition from the medical images of the patient; and
develop a treatment plan for radiotherapy based at least on the third data set of medical images and the generated contours,
wherein the one or more processors are further configured to:
train the machine learning model prior to being employed, the training including:
generating a second data set of medical images from corresponding images of a first data set of training medical images, the medical images of the first data set including medical images of a first imaging modality, and the medical images of the second data set including pseudo medical images of a second imaging modality; and using the first data set of medical images and the second data set of pseudo medical images as input data for training the machine learning model.

15. The system of claim 14,
wherein each of the medical images of the first data set includes a feature of an anatomical structure therein,
wherein the one or more processors are configured to replicate the feature of the medical images of the first data set in corresponding pseudo images of the second data set,
wherein the first imaging modality is different from the second imaging modality, wherein the one or more processors are further configured to generate the pseudo images of the second imaging modality using one of a forward projection technique, a forward projection coupled with a backward projection technique, and a trained neural network technique,
wherein the forward projection technique includes generating projection images from the medical images of the first data set, wherein the generating of the projection images includes simulating radiation passing through volumetric images of the first data set,
the simulating includes determining radiation attenuation based on a plurality of first parameters including radiation beam geometry, radiation source geometry, radiation detector geometry, and radiation interaction with matter,
the forward projecting step further includes simulating acquisition inaccuracies related to the second imaging modality,
wherein the acquisition inaccuracies include inaccuracies related to motion occurring during imaging using the second imaging modality,
wherein the forward and backward projection technique includes reconstructing the projection images into a pseudo volumetric image of the medical images of the second data set,
wherein the reconstructing of the projection images includes accumulating the projection images onto a pseudo 3D volume, and
wherein the accumulating is based on a plurality of second parameters including radiation source geometry and radiation detector geometry.

16. A non-transitory computer-readable storage medium upon which is embodied a sequence of programmed instructions, and a computer processing system that executes the sequence of programmed instructions embodied on the computer-readable storage medium to cause the computer processing system to:
generate a second data set of medical images from corresponding images of a first data set of training medical images, the medical images of the first data set including medical images of a first imaging modality, and the medical images of the second data set including pseudo medical images of a second imaging modality, the first imaging modality being different from the second imaging modality;
train a machine learning model using the first data set of medical images and the second data set of pseudo medical images; and
process one or more medical images of a patient using the trained machine learning model, wherein the execution of the sequence of programmed instructions further causes the computer processing system to:
generate the pseudo images of the second imaging modality using one of a forward projection technique, and a forward projection coupled with a backward projection technique,
wherein the forward projection technique includes generating projection images from the medical images of the first data set by simulating radiation passing through volumetric images of the first data set, and
wherein the backward projection technique includes reconstructing the projection images into a pseudo volumetric image of the medical images of the second data set, the reconstructing of the projection images including accumulating the projection images onto a pseudo 3D volume,
the forward projecting step further includes simulating acquisition inaccuracies related to the second imaging modality, the acquisition inaccuracies including inaccuracies related to motion occurring during imaging using the second imaging modality,
wherein the simulating includes determining radiation attenuation based on a plurality of first parameters including radiation beam geometry, radiation source geometry, radiation detector geometry, and radiation interaction with matter, and
wherein the accumulating is based on a plurality of second parameters including radiation source geometry and radiation detector geometry.

17. A method comprising:
generating a second data set of medical images from corresponding medical images of a first data set, the medical images of the first data set being medical images of a first imaging modality and including features of anatomical structures or anatomical conditions therein, and the medical images of the second data set being pseudo medical images of a second imaging modality and including same features therein as those included in corresponding medical images of the first data set, the first imaging modality being different from the second imaging modality; and
training a machine learning model using, as input data, the training medical images of the first data set and the features included therein and the pseudo medical images of the second data set and the features included therein,
wherein the generating of the pseudo images of the second data set includes using a neural network trained to predict a pseudo image of a second imaging modality based on an image of a first imaging modality, wherein the first and second imaging modalities are different from each other.

18. The method of claim 17, wherein the machine learning model is a segmentation model,
each of the medical images of the first data set includes a contour of the anatomical structure therein,
each of the pseudo medical images of the second data set includes the contour of the anatomical structure contained in corresponding medical images of the first data set, and
the training of the segmentation model includes using the pseudo medical images of the second data set and the contours contained therein, and the medical images of the first data set and the contours contained therein.

19. The method of claim 17, wherein the machine learning model is a diagnostic model, each of the medical images of the first data set includes a feature of an anatomical condition therein, each of the pseudo medical images of the second data set includes the feature of the anatomical condition contained in corresponding medical images of the first data set, and the training of the diagnostic model includes using the pseudo medical images of the second data set and the features of the anatomical condition contained therein and the medical images of the first data set and the features of the anatomical condition contained therein.

20. A method comprising:

generating a second data set of medical images from corresponding medical images of a first data set, the medical images of the first data set being medical images of a first imaging modality and including features of anatomical structures or anatomical conditions therein, and the medical images of the second data set being pseudo medical images of a second imaging modality and including same features therein as those included in corresponding medical images of the first data set, the first imaging modality being different from the second imaging modality;

training a machine learning model using, as input data, the training medical images of the first data set and the features included therein and the pseudo medical images of the second data set and the features included therein; and processing a third data set of medical images using the trained machine learning model to generate one or more contours of anatomical structures in the medical images of the third data set or to predict an anatomical condition from the medical images of the third data set, wherein the medical images of the third data set are of the second imaging modality, the method further comprising developing a treatment plan for radiotherapy based at least on the third data set of medical images and the generated contours.

* * * * *